US012787044B2

(12) United States Patent
Kang et al.

(10) Patent No.: US 12,787,044 B2
(45) Date of Patent: Nov. 3, 2026

(54) ELECTRONIC DEVICE AND METHOD FOR IDENTIFYING THROUGHPUT OF USER EQUIPMENT FOR SLICE

(71) Applicant: SAMSUNG ELECTRONICS CO., LTD., Suwon-si (KR)

(72) Inventors: Seungwon Kang, Suwon-si (KR); Hyoungrok Kim, Suwon-si (KR); Minyoung Lee, Suwon-si (KR); Chungkeun Lee, Suwon-si (KR); Hakyung Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 227 days.

(21) Appl. No.: 18/381,012

(22) Filed: Oct. 17, 2023

(65) Prior Publication Data

US 2024/0224305 A1 Jul. 4, 2024

Related U.S. Application Data

(63) Continuation of application No. PCT/KR2023/014943, filed on Sep. 27, 2023.

(30) Foreign Application Priority Data

Dec. 29, 2022 (KR) ........................ 10-2022-0189820

(51) Int. Cl.

*H04W 72/50* (2023.01)
*H04W 72/232* (2023.01)
*H04W 72/30* (2023.01)

(52) U.S. Cl.

CPC ......... *H04W 72/50* (2023.01); *H04W 72/232* (2023.01); *H04W 72/30* (2023.01)

(58) Field of Classification Search

CPC ... H04W 72/50; H04W 72/232; H04W 72/30; H04W 28/18; H04W 28/24; H04W 48/18; H04W 92/12

(Continued)

(56) References Cited

U.S. PATENT DOCUMENTS

| | | |
|---|---|---|
| 11,323,884 B2 | 5/2022 | Lifshitz et al. |
| 11,716,627 B2 | 8/2023 | Saroiu et al. |

(Continued)

FOREIGN PATENT DOCUMENTS

| | | |
|---|---|---|
| CN | 111565418 A | 8/2020 |
| KR | 10-2021-0117960 A | 9/2021 |

(Continued)

OTHER PUBLICATIONS

International Search Report (PCT/ISA/210) issued by the International Searching Authority on Jan. 25, 2024 in corresponding International Application No. PCT/KR2023/014943.

(Continued)

*Primary Examiner* — Candal Elpenord
(74) *Attorney, Agent, or Firm* — Sughrue Mion, PLLC

(57) ABSTRACT

A method performed by a near-real time (RT) radio access network intelligent controller (RIC), may comprise: receiving, from an E2 node, an indication message including information on a slice associated with a cell; identifying a size of a resource allocated for the slice based on the information on the slice; and transmitting, to the E2 node, a control message including information on the size of the resource, wherein the information on the slice may comprise collection duration, a sum of data volume during the collection duration, and information on a terminal associated with the slice.

16 Claims, 18 Drawing Sheets

(58) Field of Classification Search
USPC .................................................. 370/329–330
See application file for complete search history.

(56) References Cited

U.S. PATENT DOCUMENTS

| | | | | |
|---|---|---|---|---|
| 2021/0258866 | A1 | 8/2021 | Chou | |
| 2022/0116799 | A1 | 4/2022 | Wang et al. | |
| 2022/0124560 | A1* | 4/2022 | Yeh | H04L 41/5025 |
| 2022/0278906 | A1 | 9/2022 | Akman et al. | |
| 2022/0295309 | A1 | 9/2022 | Akhtar et al. | |
| 2022/0330070 | A1 | 10/2022 | Song et al. | |
| 2023/0072358 | A1* | 3/2023 | Baillargeon | G06F 9/5088 |
| 2023/0171592 | A1* | 6/2023 | Han | H04W 8/20 370/328 |
| 2023/0199519 | A1* | 6/2023 | Singh | H04W 24/02 455/414.1 |
| 2023/0199539 | A1 | 6/2023 | Lee et al. | |
| 2023/0217313 | A1* | 7/2023 | Atawia | H04W 24/02 370/252 |
| 2023/0262638 | A1 | 8/2023 | Song et al. | |
| 2023/0276465 | A1 | 8/2023 | Song et al. | |
| 2025/0016808 | A1* | 1/2025 | Grinshpun | H04W 28/24 |

FOREIGN PATENT DOCUMENTS

| | | | |
|---|---|---|---|
| KR | 10-2022-0023658 | A | 3/2022 |
| KR | 10-2022-0060956 | A | 5/2022 |
| WO | 2022039582 | A1 | 2/2022 |
| WO | 2022/103210 | A1 | 5/2022 |

OTHER PUBLICATIONS

Written Opinion (PCT/ISA/237) issued by the International Searching Authority on Jan. 25, 2024 in corresponding International Application No. PCT/KR2023/014943.

Communication dated Jan. 29, 2026, issued by the European Patent Office in European Application No. 23912474.6.

Thaliath et al., "Predictive Closed-Loop Service Automation in O-RAN Based Network Slicing" Autonomous Networks: Opportunities, Challenges, and Applications, IEEE Communications Standard Magazine, Sep. 1, 2022, pp. 8-14 (total 7 pages).

* cited by examiner

ELECTRONIC DEVICE AND METHOD FOR IDENTIFYING THROUGHPUT OF USER EQUIPMENT FOR SLICE

CROSS-REFERENCE TO RELATED APPLICATIONS

This application is a by-pass continuation application of International Application No. PCT/KR2023/014943, filed on Sep. 27, 2023, which is based on and claims priority to Korean Patent Application No. 10-2022-0189820, filed on Dec. 29, 2022, in the Korean Intellectual Property Office, the disclosures of which are incorporated by reference herein their entireties.

BACKGROUND

1. Field

The following descriptions relate to an electronic device and a method for identifying a user equipment throughput for a slice.

2. Description of Related Art

Network slicing refers to a method of virtualizing a physical network and using it as a plurality of networks. A network slice (or "slice") may refer to a virtualized network. A service level agreement (SLA) including throughput, latency, and reliability may be defined for each network slice.

SUMMARY

According to an aspect of the disclosure, a method performed by a near-real time (RT) radio access network intelligent controller (RIC), may include: receiving, from an E2 node, an indication message including information on a slice associated with a cell; identifying a size of a resource allocated for the slice based on the information on the slice: and transmitting, to the E2 node, a control message including information on the size of the resource. The information on the slice may include collection duration, a sum of data volume during the collection duration, and information on a terminal associated with the slice.

The indication message may further include a cell identity associated with the cell and index information associated with the slice, and the information on the slice may correspond to the index information.

The information on the terminal associated with the slice may include at least one of a number of terminals provided with a service through the data volume for the slice, or a number of data radio bearers (DRBs) for providing the service through the data volume for the slice.

The indication message may further include a physical resource block (PRB) allocating portion and information on a PRB usage.

The control message may further include information on a physical resource block (PRB) maximum portion for the slice associated with the cell.

According to an aspect of the disclosure, a near-real time (RT) radio access network intelligent controller (RIC) includes: memory storing instructions, a transceiver; and a processor. The instructions, when executed by the processor, may cause the Near-RT RIC to: receive, from an E2 node through the transceiver, an indication message including information on a slice associated with a cell; identify a size of a resource allocated for the slice based on the information on the slice; and transmit, to the E2 node through the transceiver, a control message including information on the size of the resource. The information on the slice may include collection duration, a sum of data volume during the collection duration, and information on a terminal associated with the slice.

The indication message may further include a cell identity associated with the cell and index information associated with the slice, and the information on the slice may correspond to the index information.

The information on the terminal associated with the slice may include at least one of a number of terminals provided with a service through a data volume for the slice, or a number of data radio bearers (DRBs) for providing the service through the data volume for the slice.

The indication message may further include a physical resource block (PRB) allocating portion and information on a PRB usage.

The control message may further include information on a physical resource block (PRB) maximum portion for the slice associated with the cell.

According to an aspect of the disclosure, a method performed by an E2 node, includes: identifying information on a slice associated with a cell; transmitting, to a near-real time (RT) radio access network intelligent controller (RIC), an indication message including the information on the slice; and receiving, from the Near-RT RIC, a control message including information on a size of a resource allocated for the slice. The information on the slice may include collection duration, a sum of data volume during the collection duration, and information on a terminal associated with the slice.

The indication message may further include a cell identity associated with the cell and index information associated with the slice, and the information on the slice may correspond to the index information.

The information on the terminal associated with the slice may include at least one of a number of terminals provided with a service through the data volume for the slice, or a number of data radio bearers (DRBs) for providing the service through the data volume for the slice.

The indication message may further include a physical resource block (PRB) allocating portion and information on a PRB usage.

The control message may further include information on a physical resource block (PRB) maximum portion for the slice associated with the cell.

According to an aspect of the disclosure, an E2 node may include: memory storing instructions, a transceiver: and a processor. The instructions, when executed by the processor, may cause the E2 node to: identify information on a slice associated with a cell: transmit, to a near-real time (RT) radio access network intelligent controller (RIC) through the transceiver, an indication message including the information on the slice; and receive, from the Near-RT RIC through the transceiver, a control message including information on a size of a resource allocated for the slice. The information on the slice may include collection duration, a sum of data volume during the collection duration, and information on a terminal associated with the slice.

The indication message may further include a cell identity associated with the cell and index information associated with the slice, and the information on the slice may correspond to the index information.

The information on the terminal associated with the slice may include at least one of a number of terminals provided with a service through the data volume for the slice, or a number of data radio bearers (DRBs) for providing the service through the data volume for the slice.

The indication message may further include a physical resource block (PRB) allocating portion and information on a PRB usage.

The control message may further include information on a physical resource block (PRB) maximum portion for the slice associated with the cell.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
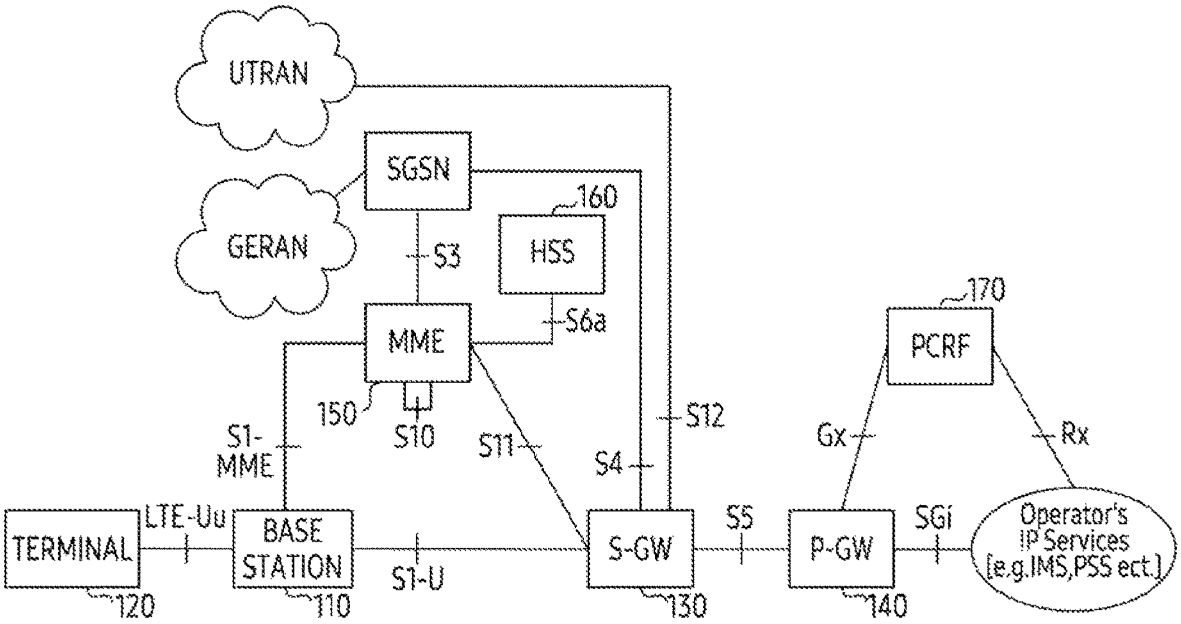
FIG. 1 illustrates an example of a 4th generation (4G) Long Term Evolution (LTE) core system.

Terms used in the disclosure are used only to describe a specific embodiment and may not be intended to limit the scope of another embodiment. A singular expression may include a plural expression unless it is clearly meant differently in the context. The terms used herein, including a technical or scientific term, may have the same meaning as generally understood by a person having ordinary knowledge in the technical field described in the disclosure. Terms defined in a general dictionary among the terms used in the disclosure may be interpreted with the same or similar meaning as a contextual meaning of related technology, and unless clearly defined in the disclosure, it is not interpreted in an ideal or excessively formal meaning. In some cases, even terms defined in the disclosure cannot be interpreted to exclude embodiments of the disclosure.

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. Similarly, the term "set" means one or more. Accordingly, the set of items may be a single item or a collection of two or more items.

In addition, in the disclosure, in order to determine whether a specific condition is satisfied or fulfilled, an expression of more than or less than may be used, but this is only a description for expressing an example, and does not exclude description of more than or equal to or less than or equal to. A condition described as 'more than or equal to' may be replaced with 'more than', a condition described as 'less than or equal to' may be replaced with 'less than', and a condition described as 'more than or equal to and less than' may be replaced with 'more than and less than or equal to'. In addition, hereinafter, 'A' to 'B' means at least one of elements from A (including A) and to B (including B).

In one or more embodiments of the disclosure described below, a hardware approach is described as an example. However, since the one or more embodiments of the disclosure include technology that use both hardware and software, the one or more embodiments of the disclosure do not exclude a software-based approach.

Hereinafter, the disclosure relates to a control procedure between a device in a radio access network (RAN) and a device controlling the RAN in a wireless communication system. Specifically, the disclosure relates to a procedure, a message, and a method for enabling an E2 node and an RIC to perform a correct operation to standard and ensure backward compatibility, by providing a version number (e.g., E2 Application Protocol (E2AP) 2.02) of the E2AP standard to the RIC by the E2 node on an E2 interface.

A term In configuration (e.g., setup, setting, arrangement, control), a term In a signal (e.g., packet, message, signal, information, signaling), a term In a resource (e.g., section, symbol, slot, subframe, radio frame, subcarrier, resource element (RE), resource block (RB), bandwidth part (BWP), occasion), a term for operational states (e.g., step, operation, procedure), a term In data (e.g., packet, message, user stream, information, bit, symbol, codeword), a term In a channel, a term In network entities (distributed unit (DU), radio unit (RU), central unit (CU), control plane (CU-CP), user plane (CU-UP), open radio access network (O-RAN) DU (O-DU), O-RAN RU (O-RU), O-RAN CU (O-CU), O-RAN CU-CP (O-CU-UP), O-RAN CU-CP (O-CU-CP)), a term In a component of a device, and the like used in the following description are exemplified for convenience of description. Accordingly, the disclosure is not limited to terms described below, and another term having an equivalent technical meaning may be used. In addition, a term such as ' . . . unit', ' . . . er', ' . . . material', ' . . . body', and the like used below may mean at least one shape structure, or may mean a unit that processes a function.

In addition, in the disclosure, in order to determine whether a specific condition is satisfied or fulfilled, an expression of more than or less than may be used, but this is only a description for expressing an example and does not exclude description of more than or equal to or less than or equal to. A condition described as 'more than or equal to' may be replaced with ' more than', a condition described as 'less than or equal to' may be replaced with 'less than', and a condition described as 'more than or equal to and less than' may be replaced with 'more than and less than or equal to'. In addition, hereinafter, 'A' to 'B' means at least one of elements from A (including A) and to B (including B).

In addition, although the disclosure describes embodiments using terms used in a part of communication standards (e.g., 3rd Generation Partnership Project (3GPP), extensible radio access network (xRAN), O-RAN), it is only an example for explanation. One or more embodiments of the disclosure may also be easily modified and applied to other communication and broadcasting system.

As $4^{th}$ generation (4G)/$5^{th}$ generation (5G) communication systems (e.g., new radio (NR)) have been commercialized, differentiated service support has been demanded from a user in a virtualized network. 3GPP is a joint research project between mobile communication related groups, and aims to establish a third-generation mobile communication system standard within a scope of IMT-2000 project of International Telecommunications Union (ITU)—globally applicable. The 3GPP was established in December 1998, and the 3GPP standard is based on advanced GSM standard, and includes all radio, core network, and service architecture in a scope of standardization. Accordingly, the O-RAN has newly defined radio unit (RU), digital unit (DU), central unit (CU)-control plane (CP), and CU-user plane (UP), which are nodes configuring a 3GPP network entity (NE) and a base station as O-RAN (O)-RU, O-DU, O-CU-CP, and O-CU-UP, respectively, and has additionally standardized a near-real-time (NRT) radio access network intelligent controller (RIC) ("near-RT RIC", hereinafter: sometimes, in short, "RIC"). The disclosure may support an operator specific service model on the E2 interface where the RIC requests a service from O-DU, O-CU-CP, or O-CU-UP. Herein, O-RU, O-DU, O-CU-CP, and O-CU-UP may be understood as objects configuring an RAN capable of operating according to the O-RAN standard and may be referred to as an E2 node. An interface with the objects configuring the RAN capable of operating according to the O-RAN standard between the RIC and the E2 nodes uses an application protocol (E2AP).

RIC is a logical node capable of collecting information at a cell site transmitted and received by a terminal and O-DU, O-CU-CP, or O-CU-UP. RIC may be implemented in a form of a server intensively disposed in one physical place. Connections between O-DU and RIC, between O-CU-CP and RIC, and between O-CU-UP and RIC may be made via Ethernet. To this end, interface standard for communication between O-DU and RIC, between O-CU-CP and RIC, and between O-CU-UP and RIC have become necessary, and message standard such as E2-DU, E2-CU-CP, and E2-CU-UP and definition of procedures between O-DU, O-CU-CP, O-CU-UP and RIC are required. In particular, since differentiated service support is required for a user in a virtualized network and call processing message/function generated by O-RANs are concentrated on RIC, functional definition of messages of E2-DU, E2-CU-CP, and E2-CU-UP to support a service for a wide range of cell coverage is required.

RIC may communicate with O-DU, O-CU-CP, and O-CU-UP by using E2 interface, and may set an event occurrence condition by generating and transmitting a subscription message. Specifically, RIC may set up a call processing event by generating an E2 subscription request message and delivering it to an E2 node (e.g., O-CU-CP, O-CU-UP, and O-DU). In addition, after set up EVENT, the E2 node delivers a subscription request response message delivered to RIC.

The E2 node may transmit a current state to RIC through an indication/report message (e.g., RIC indication message). RIC may provide with control for O-DU, O-CU-CP, and O-CU-UP, by using a control message (e.g., RIC control message). One or more embodiments of the disclosure report information for identifying user equipment throughput by network slice and propose a method for allocating resources by network slice accordingly.

FIG. 1 illustrates an example of a $4^{th}$ generation (4G) Long Term Evolution (LTE) core system.

In FIG. 1, the LTE core system include a base station 110, a terminal 120, a serving gateway (S-GW) 130, a packet data network gateway (P-GW) 140, a mobility management entity (MME) 150, a home subscriber server (HSS) 160, policy and charging rule function (PCRF) 170.

The base station 110 is a network infrastructure that provides a wireless access to the terminal 120. For example, the base station 110 is a device that performs scheduling by collecting status information such as a buffer status, available transmit power, and channel status of the terminal 120. The base station 110 has coverage defined as a certain geographic area based on a distance capable of transmitting a signal. The base station 110 is connected to the MME 150 through an S1-MME Interface. The base station 110 may be referred to as an access point (AP), eNodeB (eNB), wireless point, transmission/reception point (TRP), or another term with an equivalent technical meaning, in addition to a base station.

The terminal 120 is a device used by a user and performs a communication with the base station 110 through a wireless channel. In some cases, the terminal 120 may be operated without user involvement. In other words, the terminal 120 is a device that performs a machine type communication (MTC) and may not be carried by a user. The terminal 120 may be referred to as user equipment (UE), a mobile station, a subscriber station, a customer-premises equipment (CPE), a remote terminal, a wireless terminal, or another term with an equivalent technical meaning, in addition to a terminal.

The S-GW 130 provides data bearer, and generates or controls the data bearer according to a control of the MME 150. For example, the S-GW 130 processes a packet arriving from the base station 110 or a packet to be forwarded to the base station 110. In addition, the S-GW 130 may serve as an anchoring role during handover between base stations of the terminal 120. The P-GW 140 may function as a connection point with an external network (e.g., Internet network). In addition, the P-GW 140 allocates an Internet Protocol (IP) address to the terminal 120 and serves as an anchoring role for the S-GW 130. In addition, the P-GW 140 applies a quality of service (QOS) policy of the terminal 120 and may manage account data.

The MME 150 manages mobility of the terminal 120. In addition, the MME 150 may perform authentication and bearer management for the terminal 120. In other words, the MME 150 is in charge of mobility management and various control functions for the terminal. The MME 150 may be linked with a serving GPRS support node (SGSN).

The HSS 160 stores key information and a subscriber profile for authentication of the terminal 120. The key information and the subscriber profile are transmitted from the HSS 160 to the MME 150 when the terminal 120 accesses the network.

The PCRF 170 defines a rule for a policy and charging. Stored information is transmitted from the PCRF 170 to the P-GW 140, and the P-GW 140 may perform a control (e.g., QoS management, charging, and the like) for the terminal 120 based on the information provided from the PCRF 170.

Carrier aggregation (hereinafter, CA) technology is a technology combining a plurality of component carriers, in which one terminal increases frequency use efficiency in terms of a terminal or base station by transmitting and receiving a signal using these the plurality of component carriers at the same time. Specifically, according to the CA technology, a terminal and a base station may transmit and receive a signal using broadband by using the plurality of component carriers in uplink (UL) and downlink (DL), respectively, and each component carriers is located in different frequency bands in this case. Hereinafter, the uplink refers to a communication link in which the terminal transmits a signal to the base station, and the downlink refers to a communication link in which the base station transmits a signal to the terminal. In this case, the number of uplink component carriers and downlink component carriers may be different from each other.

Dual connectivity or multi-connectivity is a technology in which one terminal increases frequency use efficiency in terms of a terminal or base station, by transmitting and receiving a signal by simultaneously using a carrier within a plurality of base stations connected to a plurality of different base stations and located in different frequency bands. The terminal may be simultaneously connected to a first base station (e.g., a base station that provides a service using LTE technology or 4G mobile communication technology) and a second base station (e.g., a base station that provides a service using new radio (NR) technology or $5^{th}$ generation (5G) mobile communication technology) to transmit and receive traffic. In this case, frequency resources used by each base station may be located in different bands. In this way, a method that operates based on a dual connection method of LTE and NR may be called 5G non-standalone (NSA).

Figure 2A:
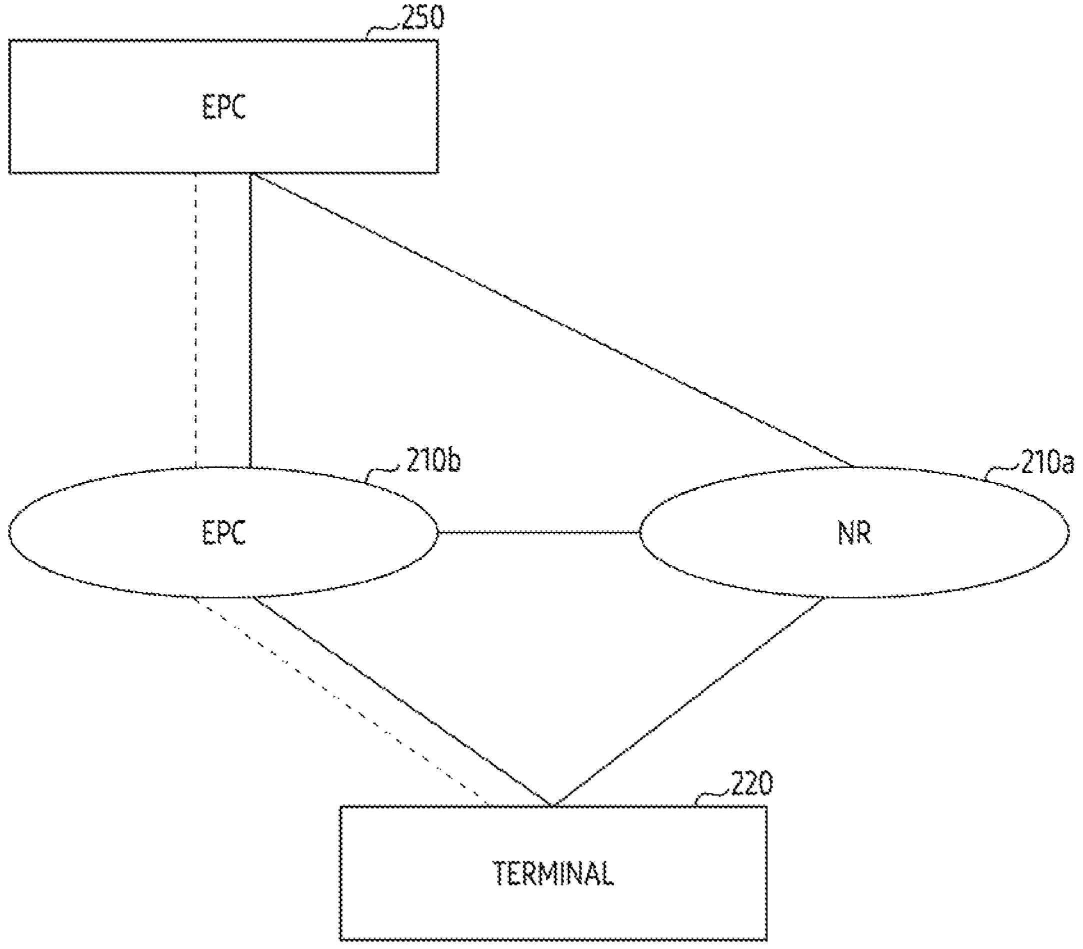
FIG. 2A illustrates an example of a 5th generation (5G) non-standard alone (NSA) system.

FIG. 2A illustrates an example of a $5^{th}$ generation (5G) non-standard alone (NSA) system.

In FIG. 2A, the 5G NSA system includes an NR RAN 210*a*, an LTE RAN 210*b*, a terminal 220, and an evolved packet core (EPC) 250. The NR RAN 210*a* and the LTE RAN 210*b* are connected to the EPC 250, and the terminal 220 may receive a service from either or both of the NR RAN 210*a* and the LTE RAN 210*b* at the same time. The NR RAN 210*a* includes at least one NR base station, and the LTE RAN 210*b* includes at least one LTE base station. Herein, the NR base station may be referred to as 5th generation node, next generation node B (gNB)' or another term with an equivalent technical meaning. In addition, the NR base station may have a structure divided into a central unit (CU) and a digital unit (DU), and in addition the CU may have a structure divided into a control plane (CU-CP) unit and a user plane (CU-UP) unit.

In a structure shown in FIG. 2A, the terminal 220 may perform a radio resource control (RRC) access through a first base station (e.g., a base station belonging to the LTE RAN 210*b*) and receive a service provided by a control plane (e.g., connection management, mobility management, and the like). In addition, the terminal 220 may be provided with an additional radio resource to transmit and receive data through a second base station (e.g., a base station belonging to the NR RAN 210*a*). This dual connectivity technology using the LTE and the NR may be referred to as evolved universal terrestrial radio access (E-UTRA)-NR dual connectivity (EN-DC). Similarly, dual connectivity technology in which the first base station uses the NR technology and the second base station uses the LTE technology is referred to as NR-E-UTRA dual connectivity (NE-DC). In addition, one or more embodiments may be applied to other various forms of multi-connection and carrier aggregation technology. In addition, one or more embodiments may be applied even when a first system using the first communication technology and a second system using the second communication technology are implemented in one device, or when the first base station and the second base station are located in the same geographic location.

Figure 2B:
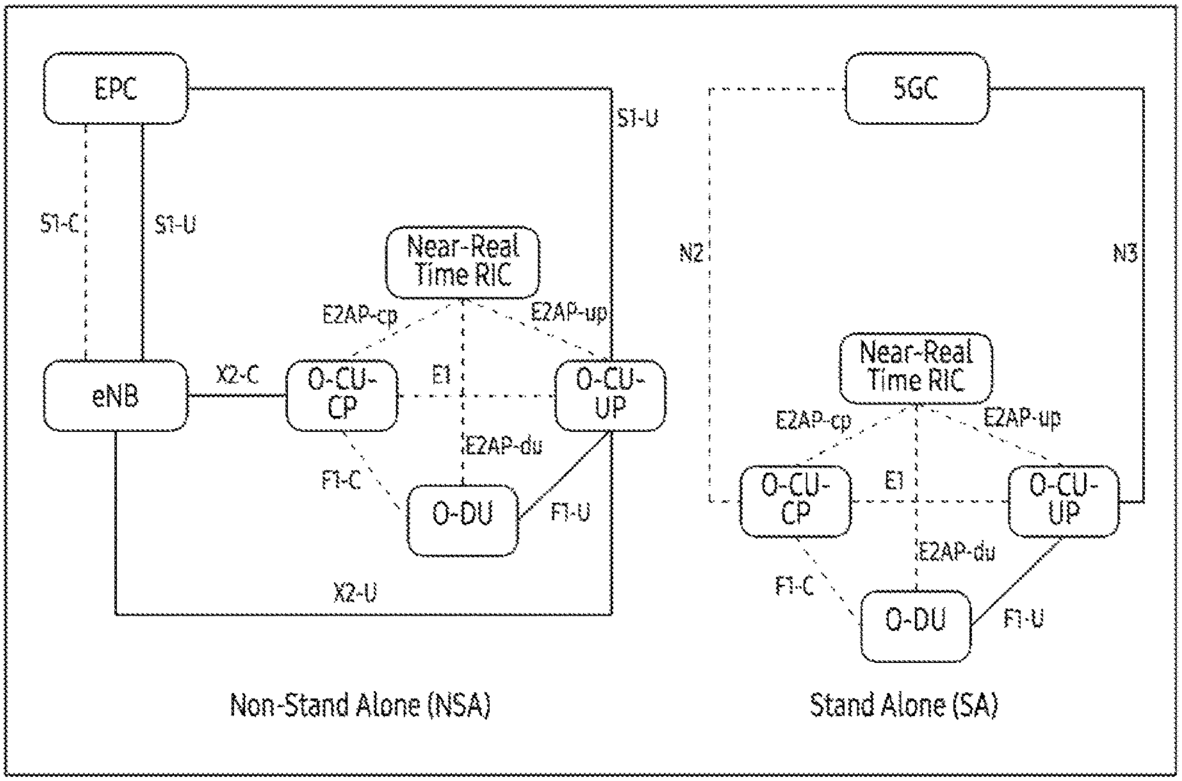
FIG. 2B illustrates an example of an architecture for an open radio access network (O-RAN).

FIG. 2B illustrates an example of an architecture for an O-RAN. For a purpose of key performance indicator (KPI) monitoring (E2-SM-KPI) of an E2 service model, while O-RAN non-standalone mode within multi-connectivity operation using E-UTRA and the NR radio access technology is considered, the E2 node may be assumed to be in O-RAN stand-alone mode.

In FIG. 2B, in deployment of the O-RAN non-standalone mode, the eNB is connected to the EPC through S1-C/S1-U interface and the O-CU-CP through X2 interface. The O-CU-CP for deployment of the O-RAN standalone mode may be connected to 5G core (5GC) through N2/N3 interface.

A discussion for improvement of initial 5G mobile communication technology and performance enhancement are underway in consideration of services in which 5G mobile communication technology was intended to support, and physical layer standardization for technologies such as Vehicle-to-everything (V2X) for helping a driving decision of autonomous vehicle and increasing user convenience based on a location of a vehicle transmitted by the vehicle and status information, New Radio Unlicensed (NR-U) aiming to system operate that meets various regulatory requirements in unlicensed bands, NR UE Power Saving, Non-Terrestrial Network (NTN), which is terminal-satellite direct communication to secure coverage in areas where communication with ground networks is not possible, and positioning is in progress.

Standardization in a field of a wireless interface architecture/protocol for technologies such as Industrial Internet of Things (IIoT) for new service support through linkage and convergence with other industries, Integrated Access and Backhaul (IAB) providing a node for network service area expansion by integrating and supporting a wireless backhaul link and an access link, Mobility Enhancement including Conditional handover and Dual Active Protocol Stack (DAPS) handover, and 2-step random access simplifying random access procedures (2-step RACH for NR) is also in progress, and standardization in a field of a system architecture/protocol for 5G baseline architectures (e.g., Service based Architecture, Service based Interface) for grafting Network Functions Virtualization (NFV) and Software-Defined Networking (SDN) technologies, Mobile Edge Computing (MEC) receiving a service based on a location of the terminal, and the like is in progress.

When such 5G mobile communication system are commercialized, connected devices that are on an explosive rise will be connected to a communication network, and as a result, it is expected that the function and performance enhancement of the 5G mobile communication system and the integrated operation of connected devices will be required. To this end, new research will be conducted on 5G performance improvement and complexity reduction, AI service support, metaverse service support, and drone communication, by using extended Reality (XR) for efficiently supporting Augmented Reality (AR), Virtual Reality (VR), and Mixed Reality (MR), Artificial Intelligence (AI), and Machine Learning (ML).

In addition, the development of such the 5G mobile communication system may be to be the basis for the development of full duplex technology to enhance frequency efficiency and improve system network of 6G mobile communication technology, AI-based communication technology that realizes system optimization by utilizing satellite and artificial intelligence (AI) from a design stage and internalizing end-to-end AI support function, and next-generation distributed computing technology that uses ultra-high-performance communication and computing resources to realize a service of complexity beyond limits of terminal calculation capability, as well as multiple antenna transmission technology, such as a new waveform to ensure coverage in terahertz band of 6G mobile communication technology, Full Dimensional MIMO (FD-MIMO), Array Antenna, and Large Scale Antenna, high-dimensional spatial multiplexing technology using metamaterial-based lenses and antennas for improving coverage of terahertz band signal and Orbital Angular Momentum (OAM), and reconfigurable intelligent surface (RIS) technology.

FIGS. 1 to 2B illustrate examples of 4G and/or 5G environments, but this description does not limit the scope of the communication environment of the embodiments of the disclosure. The technical principles according to embodiments of the disclosure may also be applied to 6G and post-6G communication technologies and network environments.

Figure 3:
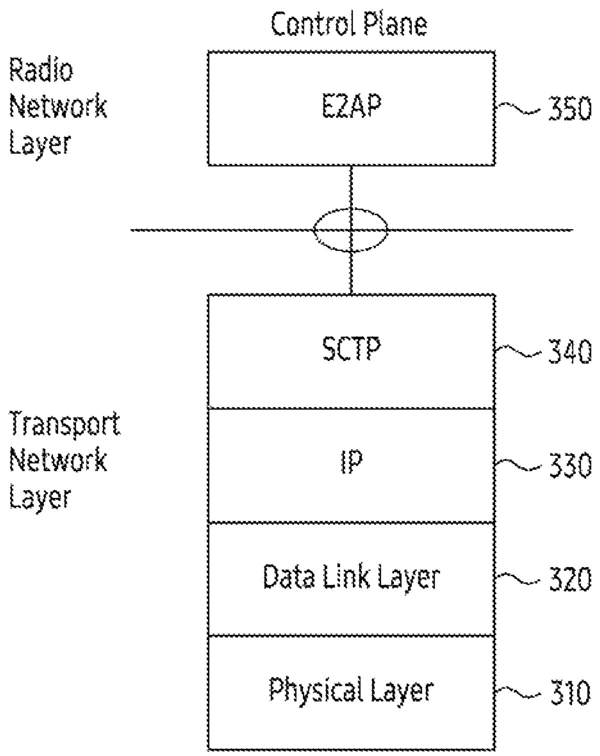
FIG. 3 illustrates an example of a protocol stack of an E2 application protocol message in a RAN.

FIG. 3 illustrates an example of a protocol stack of an E2 application protocol message in a radio access network.

In FIG. 3, a control plane includes a transport network layer and a radio network layer. The transport network layer includes a physical layer 310, a data link layer 320, an internet protocol (IP) 330, and a stream control transmission protocol (SCTP) 340.

The radio network layer includes an E2AP 350. The E2AP 350 is used to deliver a subscription message, an indication message, a control message, a service update message, and a service query message, and is transmitted at a higher layer of the SCTP 340 and the IP 330.

Figure 4:
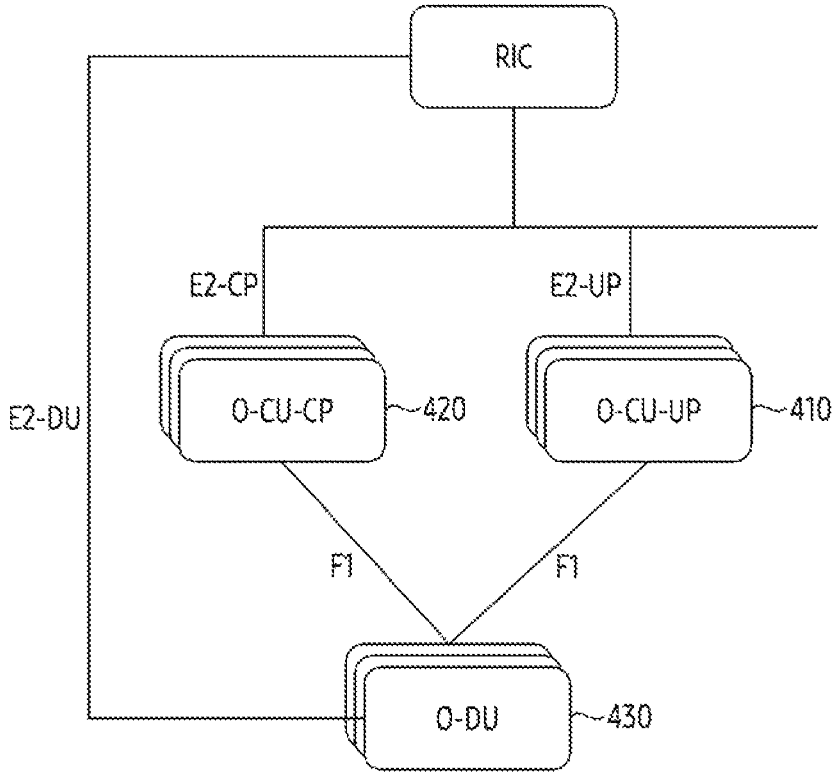
FIG. 4 illustrates an example of a connection between a base station and a radio access network intelligence controller (RIC) in an RAN.

FIG. 4 illustrates an example of a connection between a base station and an RIC in a radio access network.

In FIG. 4, an RIC 440 is connected to an O-CU-CP 420, an O-CU-UP 410, and an O-DU 430. The RIC 440 is a device for customizing RAN functionality for a new service or regional resource optimization. The RIC 440 may provide functions such as network intelligence (e.g., policy enforcement, handover optimization), resource assurance (e.g., radio-link management, advanced self-organized-network (SON)), and resource control (load balancing, slicing policy). The RIC 440 may communicate with the O-CU-CP 420, the O-CU-UP 410, and the O-DU 430. The RIC 440 may be connected to each node through an E2-CP, E2-UP, and E2-DU interface. In addition, an interface between the O-CU-CP and the DU and between the O-CU-UP and the DU may be referred to as an F1 interface. In the following description, the DU and the O-DU, the CU-CP and the O-CU-CP, and the CU-UP and the O-CU-UP may be mixed.

FIG. 4 illustrates one RIC 440, but according to one or more embodiments, a plurality of RICs may exist. The plurality of RICs may be implemented with a plurality of hardware located in the same physical location or may be implemented through virtualization using one hardware.

Figure 5:
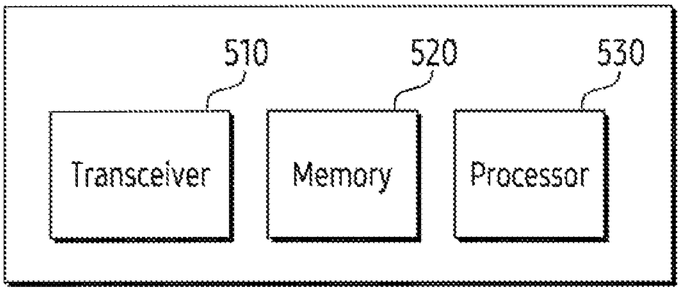
FIG. 5 illustrates an example of a configuration of a device in a RAN.

FIG. 5 illustrates an example of a configuration of a device in a radio access network.

A structure illustrated in FIG. 5 may be understood as a configuration of a device having at least one function of near-RT RIC, non-RT RIC, O-CU-CP, O-CU-UP, and O-DU of FIG. 5. Hereinafter, terms such as ' . . . unit' and ' . . . er' used below refer to a unit that processes at least one function or operation, and may be implemented by a hardware, a software, or a combination of the hardware and the software.

In FIG. 5, a core network device comprises a transceiver 510, a memory 520, and a processor 530.

The transceiver 510 provides an interface for performing a communication with other devices in a network. That is, the transceiver 510 converts a bit string transmitted from the core network device to another device into a physical signal, and converts a physical signal received from another device into a bit string. That is, the transceiver 510 may transmit and receive a signal. Accordingly, the transceiver 510 may be referred to as a communication unit, a modem, a transmit unit, a receiving unit, or a transmit/receive unit. At this time, the transceiver 510 enable the core network device to communicate with other devices or a system through a backhaul connection (e.g., wired backhaul or wireless backhaul) or a network. Although only one transceiver 510 is illustrated in FIG. 5, a device may include one or more transceivers.

The memory 520 stores data such as a basic program, an application program, and setup information for an operation of the core network device. The memory 520 may be referred to as a storage unit. The memory 520 may be configured with a volatile memory, a nonvolatile memory, or a combination of the volatile memory and the nonvolatile memory. In addition, the memory 520 provides stored data according to a request of the processor 530.

The processor 530 controls overall operations of a network element (NE) device such as E2 node or near-RT RIC. For example, the processor 530 transmits and receives a signal through the transceiver 510. In addition, the processor 530 records data in the memory 520 and reads. Although only one processor 530 is illustrated in FIG. 5, a device may include one or more processors. According to one or more embodiments, the processor 530 may control a device to perform operations according to one or more embodiments described in the disclosure.

Figure 6:
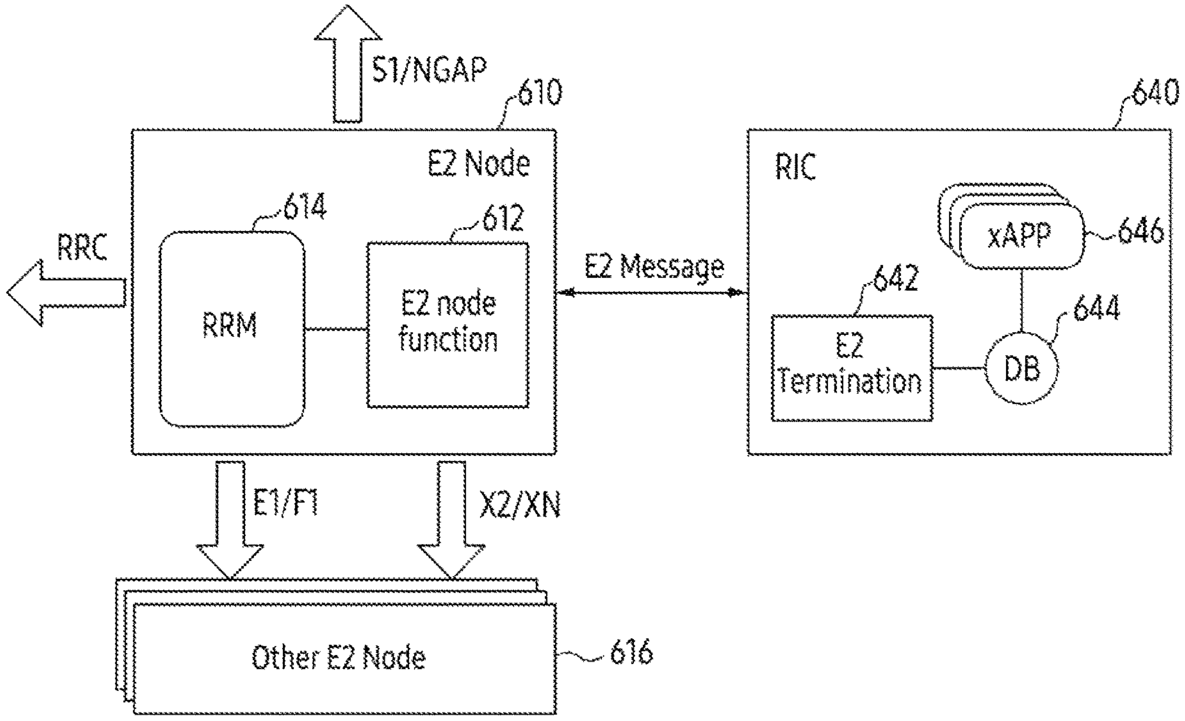
FIG. 6 illustrates an example of a logical function related to an E2 message of an E2 node and an RIC in an RAN.

FIG. 6 illustrates an example of a logical function related to an E2 message of an E2 node and an RIC in a radio access network. The E2 message may be understood to refer to messages transmitted through the E2 interface.

In FIG. 6, an RIC 640 and an E2 node 610 may transmit or receive the E2 messages to each other. For example, the E2 node 610 may be an O-CU-CP, an O-CU-UP, an O-DU, or a base station. A communication interface of the E2 node may be determined according to a type of the E2 node 610. For example, the E2 node 610 may communicate with another E2 node 616 through an E1 interface or an F1 interface. Alternatively, for example, the E2 node 610 may communicate with the E2 node 616 through an X2 interface or an XN interface. Alternatively, for example, the E2 node 610 may communicate through an S1 interface or a next generation application protocol (NGAP) interface (i.e., an interface between a next generation (NG) RAN node and the AMF).

The E2 node 610 may include an E2 node function 612. The E2 node function 612 is a function corresponding to a specific application S/W (xApp) 646 installed in the RIC 640. For example, in a case of a KPI monitor, a KPI monitor collection S/W is installed in the RIC 640, and the E2 node 610 may include the E2 node function 612 that transmits an E2 message including a KPI parameter to an E2 termination 642 located in the RIC 640 after generating the KPI parameter. The E2 node 610 may include a radio resource management (RRM) 614. The E2 node 610 may manage a resource provided to a radio network for a terminal.

The E2 termination 642 located in the RIC 640 is a termination of the RIC 640 for the E2 message, and performs a function of interpreting the E2 message delivered by the E2 node 610 and then delivering it to the xApp 646. Database (DB) 644 located in the RIC 640 may be used for the E2 termination 624 or the xApp 646. The E2 node 610 illustrated in FIG. 6 is a termination of at least one interface, and may be understood as a termination of messages delivered to a terminal, a surrounding base station, and a core network.

Figure 7:
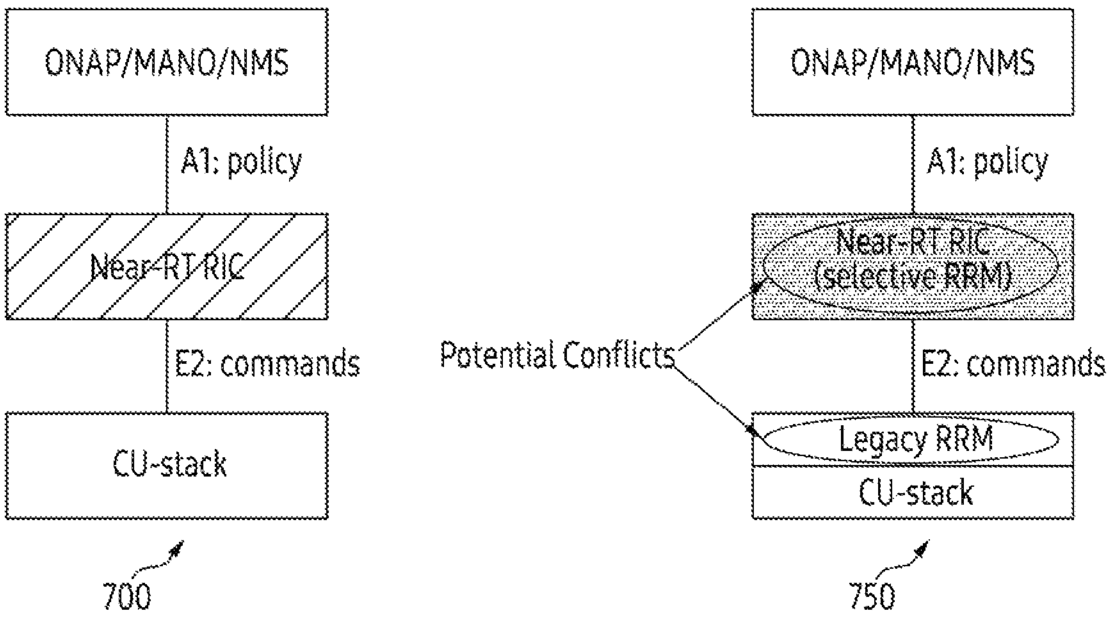
FIG. 7 illustrates examples of a function split between an E2 node and an RIC.

FIG. 7 illustrates examples of a function split between an E2 node and an RIC.

The O-RAN standard provides a function split between the E2 node and the RIC. For example, the E2 node may be a CU. The RIC may be Near RT RIC. The RIC may be connected to an open network automation platform (ONAP)/management and orchestration (MANO)/network management system (NMS) through an AI interface. The RIC may be connected to the E2 node through an E2 interface. The E2 interface may transmit commands. Function split option may include a function split 700 in which the entire RRM) is managed by near-RT RIC, and a function split 750 in which the RRM is selectively managed by the near-RT RIC.

According to WG3 decision of a conference, the near-RT RIC will support E2 as an open logical interface targeting a multi-vendor environment, regardless of the specific RRC-RRM algorithm implementation located in the near-RT RIC. In the disclosure, an E2 Service Model Radio Interface Control (E2SM-RIC) paired with an E2SM-NI capable of performing injection/modify/configuration Per UE RRC messages for each interface (I/F) and network entity (NE) may be proposed. In other words, the near RT RIC may be improved gradually in a direction of the function split 700 from the function split 750. The E2 may be developed into an open logical interface that is independent of implementation of a specific RRC-RRM algorithm in the near RT-RIC and targets a multi-vendor environment.

Figure 8:
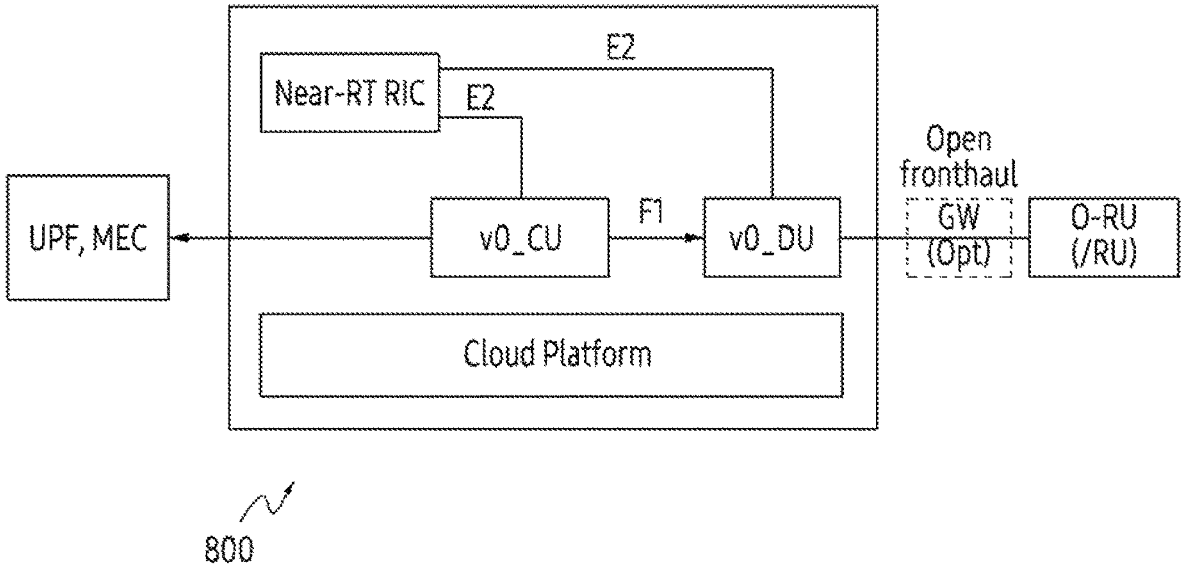
FIG. 8 illustrates an implementation example of an E2 node and an RIC.

FIG. 8 illustrates an implementation example of an E2 node and an RIC.

In FIG. 8, in a scenario of implementation example 800, an E2 node (e.g., O-DU, O-CU) and an RIC may be virtualized on a cloud platform (e.g., open chassis and blade specification edge cloud) to be configured on a device (e.g., a server). The scenario may support deployment in a dense urban area with abundant front-hole capacity allowing a BBU function that is pooled to a central location with low enough latency to satisfy O-DU latency requirement. Therefore, there may be no need to attempt to centralize RIC close to RT beyond a limit to centralize an O-DU function. According to an embodiment, the E2SM-RIC may be optimized for an O-RAN deployment scenario in which Near-RT RIC, O-CU, and O-DU are implemented on O-Cloud Platform.

Figure 9:
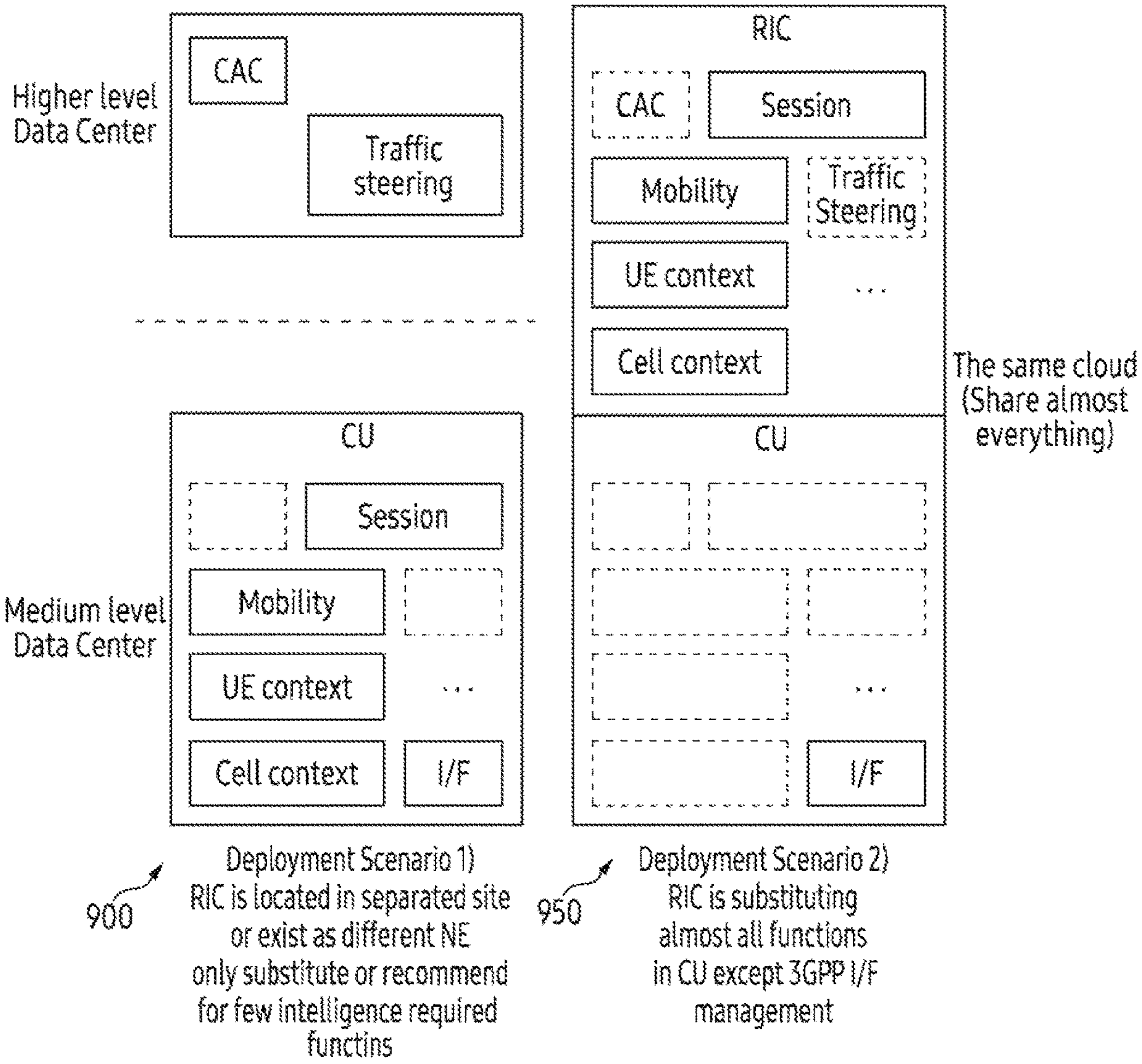
FIG. 9 illustrates examples of a function split between a centralized unit (CU) and an RIC.

FIG. 9 illustrates examples of a function split between a centralized unit (CU) and an RIC.

In FIG. 9, function splits may be performed according to a deployment scenario #1 900 or a function deployment scenario #2 950.

Deployment scenario #1 900: RIC is located at a separate site or exists only as a different NE, replacing some intelligence essential features or recommended.

Deployment scenario #2 950: RIC may replace almost all functions of CU except 3GPP I/F management.

FIG. 9 illustrates two scenarios, but other scenarios may be applied. For example, in the deployment scenario #1 900, a mobility function may be performed by the RIC rather than the CU. In addition, for example, in the deployment scenario #1 900, a UE context function may be performed by the RIC rather than the CU. In addition, for example, in the deployment scenario #1 900, a session setup function may be performed by the RIC rather than the CU.

Figure 10A:
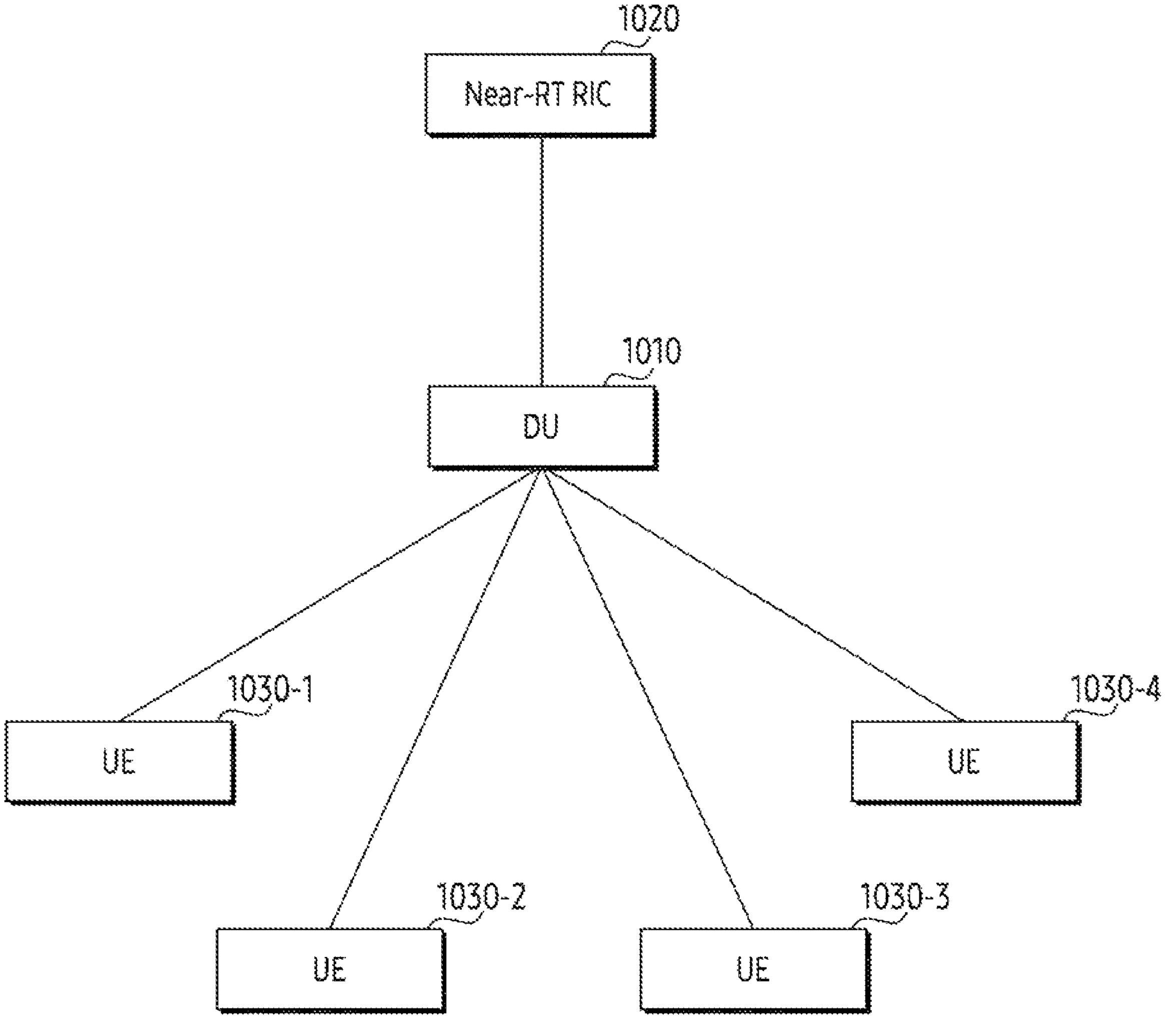
FIG. 10A illustrates an example of a connection between an RIC, an E2 node, and a user equipment in an RAN.

FIG. 10A illustrates an example of a connection between an RIC, an E2 node, and a terminal in a radio access network.

In FIG. 10A, a near-RT RIC (hereinafter, "RIC") 1020 may be connected to a DU 1010 connected to a plurality of terminals 1030-1, 1030-2, 1030-3, and 1030-4. The DU 1010 may also be referred to as an O-DU. An example of a connection state of the RIC 1020, the DU 1010), and terminals 1030-1, 1030-2, 1030-3, and 1030-4 of FIG. 10A are merely illustrative for convenience of explanation, and embodiments of the disclosure are not limited to the examples of FIG. 10A. For example, the DU 1010 is an example of an E2 node, and in embodiments of the disclosure, an E2 node connected to the RIC 1020 will not be limited to the DU 1010. For example, the DU 1010 may be understood substantially the same as CU, CU-UP, and CU-CP. In addition, an example of FIG. 10A shows that the RIC 1020 is connected to a DU 1010, but the RIC 1020 may be connected to a plurality of DUs 1010. In addition, an example of FIG. 10A shows that the DU 1010 is connected to four terminals 1030-1, 1030-2, 1030-3, and 1030-4, but the DU 1010 may be connected to at least one terminal.

Network slicing refers to a method of virtualizing a physical network and using it as a plurality of networks. A network slice may refer to a virtualized network. A service level agreement (SLA) including throughput, latency, and reliability may be defined for each network slice (or slice). The SLA may indicate an agreement that defines a target value for a service between a provider providing the service and a user receiving the service in providing the service through a slice. For example, the SLA may include throughput of different terminal levels according to a slice.

For example, the DU 1010 may configure at least one cell. The cell may be associated with at least one network slice for providing various services. For example, a first cell may be associated with a network slice A to provide x service and a network slice B to provide y service. In addition, a second cell may be associated with a network slice C to provide x service.

The DU 1010 may allocate resources to provide a service for the plurality of terminals 1030-1, 1030-2, 1030-3, and 1030-4. For example, the DU 1010 may allocate resources to provide a service, based on control information received from the RIC 1020. For example, in the same cell (e.g., the first cell), the DU 1010 may allocate resources to provide the x service and the y service for the plurality of terminals 1030-1, 1030-2, 1030-3, and 1030-4. For example, the DU 1010 may allocate resources for the plurality of terminals 1030-1, 1030-2, 1030-3, and 1030-4, based on resource information received from the RIC 1020.

In the above-described, the DU 1010 may measure a state (e.g., a key performance indicator (KPI)) of a service provided for the plurality of terminals 1030-1, 1030-2, 1030-3, and 1030-4 and transmit measured information to the RIC 1020. The RIC 1020 may identify resource allocation information to provide a service for the plurality of terminals 1030-1, 1030-2, 1030-3, and 1030-4, based on information received from the DU 1010. The RIC 1020 may transmit control information including the resource allocation information to the DU 1010.

The RIC 1020 may control the DU 1010, based on a state (or the KPI) of the service provided through the E2 interface. For example, the RIC 1020 may identify whether a service provided to terminals 1030-1, 1030-2, 1030-3, and 1030-4 satisfy the SLA required by the operator. The RIC 1020 may control the DU 1010 according to identification result. For example, identifying whether the SLA required by the operator is satisfied may be understood as identifying whether throughput of a terminal level is greater than or equal to a reference value. The throughput of the terminal level may be identified based on data volume for a specific time.

Operators may identify whether a service provided for each terminal of the plurality of terminals 1030-1, 1030-2, 1030-3, and 1030-4 satisfies the SLA and request that an optimal service be provided for each terminal. However, it may be difficult for the DU 1010 to distinguish terminals receiving a service through all cells supportable the DU 1010 and at least one slice related to each cell, and to identify throughput for each terminal. Since a plurality of slices may be set for one terminal, identifying data volume and time provided by each terminal by the DU 1010 and managing throughput by each terminal may be limited by complexity and memory limitation of the DU 1010.

Previously, the DU 1010 may report a sum of data volume transmitted without distinction of terminal for each cell-related slice and a sum of time at which each data volume is scheduled, to the RIC 1020. Accordingly, the RIC 1020 may control the DU 1010 based on the data volume provided for each slice and information on time at which the data volume is scheduled. However, performance of a network which is identified based on the data volume provided for each slice and information on scheduled time and provides a service, may differ from actual service providing state. Details related to this will be described in FIG. 10B below.

Figure 10B:
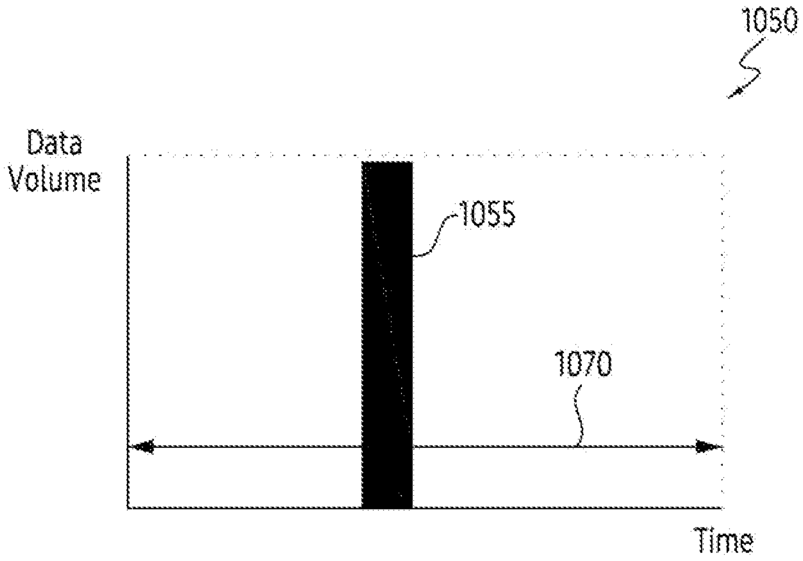
FIG. 10B illustrates examples of data volume according to a flow of time for identifying user equipment throughput.
Figure 10B:
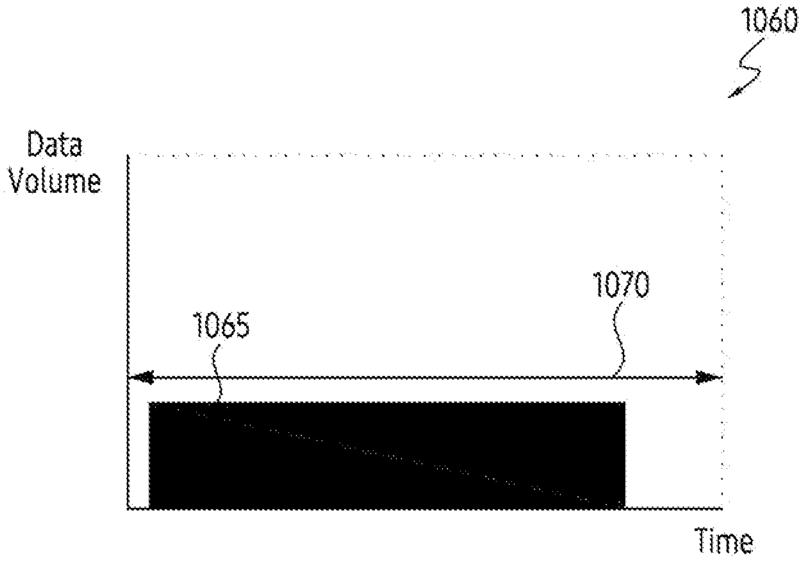

FIG. 10B illustrates examples of data volume according to a flow of time for identifying user equipment throughput.

FIG. 10B illustrates a first example 1050 in which a large volume of data is allocated for a relatively short-term and a second example 1060 in which a volume of data is allocated for a relatively long term. Horizontal axis of the first example 1050 and the second example 1060 indicates time, and vertical axis indicates a data volume.

In the first example 1050, a resource 1055 for providing a service to a terminal may be allocated to have a first data volume during first time. In the second example 1060, a resource 1065 for providing a service to a terminal may be allocated to have a second data volume lower than the first data volume for second time longer than the first time. It is assumed that a sum of data volume during the entire time interval 1070 of the first example 1050 and the second example 1060 is the same. The entire time interval 1070 may be referred to as a collection period of measured data volume, in order for the DU to identify throughput of a terminal for each slice.

In the above-described examples 1050 and 1060, a case in which the DU identifies throughput for a resource scheduled to a terminal for each slice may identify throughput based on ratio of data volume provided for each slice and time information in which the data volume is scheduled, and may identify whether the throughput is greater than or equal to a reference value. Considering that the first data volume of the first example 1050 is scheduled only during the first time, throughput of the first example 1050 may satisfy the SLA standard. On the other hand, considering that the second data volume of the second example 1060 is scheduled during the second time, throughput of the second example 1060 may not satisfy the SLA standard. However, since a resource are not allocated to a terminal of the first example 1050 except for a specific time (e.g., the first time), a service may not be substantially provided. Therefore, identifying throughput for a resource scheduled to a terminal may only indicate performance at a modem level, which is performance of a part where data exists, and may not be appropriate to evaluate performance at an application level, which is performance during a time when the user is actually provided with a service.

Hereinafter, the disclosure proposes a method for transmitting a time interval for collecting data volume to which the DU is transmitted, a sum of the data volume transmitted for each slice related to the cell, and the number of terminals (or the number of data radio bearers (DRBs)) for each slice to the RIC and controlling resource allocation of DU through user equipment throughput identified based thereon.

Figure 11:
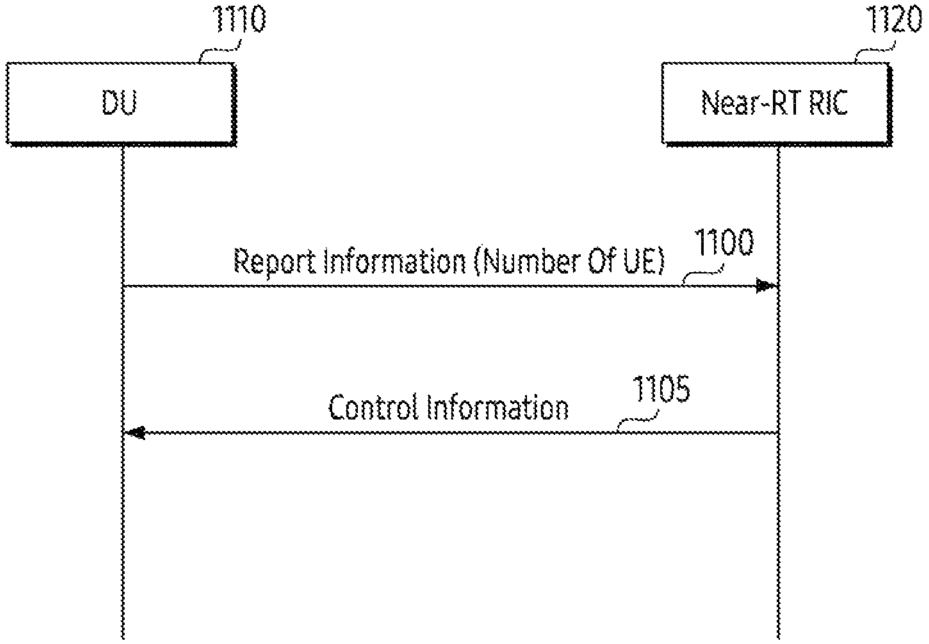
FIG. 11 illustrates an example of resource allocation based on user equipment throughput for a slice.

FIG. 11 illustrates an example of resource allocation based on user equipment throughput for a slice.

In FIG. 11, in operation 1100, the DU 1110 may transmit report information to the RIC 1120. According to an embodiment, the report information may include information on the number of UEs connected to a cell provided to the DU 1110. For example, the report information may include the following information.

TABLE 1

| Name | Description |
|---|---|
| CellResourceControlList | |
| > CellResourceControlItem | |
| >>Cell Global ID | Cell ID |
| >> slice-report-list | |
| >>> slice-index | Slice Index |
| >>> throughput-report | |
| >>> transmitted-volume | summed volume during collection duration |
| >>>> collection-duration | Collection duration = Report Period |
| >>>> total-number-of-ue | Total Number of UEs used for throughput-volume collection |
| >>>> prb-usage-report | |
| >>>>> assigned-prb-portion | assigned prb portion |
| >>>>> prb-usage | prb usage |

According to an embodiment, the report information may include information (CellResourceControlList) for cell resource control. For example, the information for cell resource control may include a cell ID and a slice report list.

The slice report list may include an index for a slice related to the cell ID and information (throughput-report) for reporting throughput. The information for reporting throughput may include a volume of transmitted data, collection duration, and the number of terminals (user equipment (UE)). For example, the volume of transmitted data may indicate a sum of data volume during the collection duration. The collection duration may indicate the entire time interval (or report period) in which a resource for providing a service to the terminal are measured. The entire time interval may include a time when a data volume exists and a time when a data volume does not exist. The number of terminals may indicate the total number of terminals related to the data volume for a slice of a specific cell. The report information may include an allocated PRB portion and a PRB usage. The report information may be referred to as performance data (or performance measurement).

According to an embodiment, the DU 1110 may collect or identify information for reporting throughput. For example, the DU 1110 may collect or identify the information for reporting throughput for each slice related to a specific cell. For example, the DU 1110 may collect or identify the sum of volume of data transmitted during a specific report period for each slice. The specific report period may be referred to as a collection duration. In addition, the DU 1110 may collect or identify the total number of terminals that receive a service through the volume of transmitted data for each slice.

According to an embodiment, the DU 1110 may transmit the report information to the RIC 1120 through an E2 interface. For example, the report information may be included in an indication message. For example, the indication message may include an RIC indication message. For example, the RIC indication message may include a message container, and the message container may include the report information.

In operation 1105, the RIC 1120 may transmit control information to the DU 1110. For example, the RIC 1120 may transmit control information to the DU 1110 through the E2 interface. According to an embodiment, the control information may include information on a PRB maximum portion for each slice related to a specific cell. For example, the control information may be included in a control message. For example, the control message may include an RIC control message.

According to an embodiment, the RIC 1120 may receive the report information from the DU 1110 and identify user equipment throughput(or user equipment level throughput) for each slice related to the specific cell based on the received report information. For example, the RIC 1120 may identify average of user equipment throughput for each slice based on the report information. The average of user equipment throughput may be identified based on a sum of data volume transmitted during the collection duration, a length of the collection duration, and a total number of terminal.

According to an embodiment, the RIC 1120 may identify whether SLA for each slice is satisfied based on the identified average of user equipment throughput and a reference throughput. The reference throughput may be set as a predetermined value according to the SLA by operator. The SLA may indicate a metric for indicating a service characteristic.

According to an embodiment, when the average of user equipment throughput satisfies the SLA, the RIC 1120 may maintain a current resource allocation state for each slice. On the other hand, when the average of user equipment throughput does not satisfy the SLA, the RIC 1120 may identify a resource allocation size to change the resource allocation state for each slice, for satisfying the SLA. For example, when an average of user equipment throughput for a first slice satisfies a first SLA related to the first slice, and an average of user equipment throughput for a second slice does not satisfy a second SLA related to the second slice, the RIC 1120 may change a resource allocation state for the first slice and a resource allocation state for the second slice. For example, the RIC 1120 may change the resource allocation state for the first slice within a range in which a changed average of user equipment throughput for the first slice satisfies the first SLA. In addition, the RIC 1120 may change the resource allocation state for the second slice so that the changed average of user equipment throughput for the second slice satisfies the second SLA. Resource information (or resource allocation size) for changing the resource allocation state may include a PRB maximum portion for each slice related to a specific cell.

In an embodiment, the DU 1110 may identify a resource size allocated to a terminal for each slice through the control information received in operation 1105, and may allocate resource to the terminal for each slice based on the identified resource size. In addition, the DU 1110 may provide a service corresponding to the slice to a terminal through the allocated resource.

FIG. 11 illustrates an example in which an operation 1105 in which the RIC 1120 generates control information and transmits it to the DU 1110 is performed based on the report information received through operation 1100, but the embodiments of the disclosure are not limited thereto. For example, the RIC 1120 may identify and only store the report information received from operation 1100, and may not immediately generate the control information based on the received report information. In other words, operation 1105 may not necessarily be performed consecutively after operation 1100. Alternatively, the RIC 1120 may transmit control information based on other information rather than the received report information.

FIG. 11 illustrates the DU 1110 as an example of an E2 node that transmits or receives a signal with a near-RT RIC to explain operations for controlling resource allocation. However, embodiments of the disclosure are not limited thereto. For example, the E2 node may include CU, CU-CP, or CU-UP in addition to the DU 1110.

In an embodiment, according to a further embodiment, prior procedures for the E2 interface may be performed first. The DU 1110 may be connected to near-RT RIC 1120 (hereinafter, referred to as RIC). For example, the DU 1110 may transmit an E2 setup request(SET UP REQUEST) message to the RIC 1120. The E2 node function located in the DU 1110 may find the RIC using IP address of the RIC 1120 set to operation-administration-maintenance (OAM) and transmit the E2 setup request message. The E2 setup request message may include information (e.g., RAN Function Definition) on a function of the RAN supported by the DU 1110 and E2 node ID information, and the like. The RAN Function Definition value is a value set to the OAM. For example, the RAN Function Definition value may include a STYLE ID value. The RIC 1120 may determine which call processing function is supported by the DU 1110, based on the RAN Function Definition value, by receiving information on the value set to the OAM.

In response to the E2 setup request message, the RIC 1120 may receive an E2 setup response (E2 SETUP RESPONSE) message from the DU 1110. The RIC 1120 may determine whether the E2 setup response message transmitted by the DU 1110 is acceptable. The RIC 1120 may transmit the E2 setup response message to the DU 1110 when the E2 setup request MESSAGE is acceptable.

The RIC 1120 may transmit a subscription request (RIC SUBSCRIPTION REQUEST) message to the E2 node. A specific xApp located in the RIC 1120 requests subscription (or join) for a specific RAN Function Definition function supported by E2 to the RIC E2 termination function. According to an embodiment, the subscription request message and the E2 setup response message may be separately transmitted. According to another embodiment, the subscription request message may be included in the E2 setup response message and transmitted together.

The DU 1110 may transmit a subscription request response (RIC SUBSCRIPTION RESPONSE) to the RIC 1120. The E2 node function of the DU 1110 may decode the subscription request message. After the RIC 1120 successfully sets an event condition requested by the E2 node function, the E2 node function of the DU 1110 may deliver to the RIC 1120 that an event trigger condition has been successfully set through a subscription response.

In the above-described, a device and a method for identifying user equipment throughput for each slice according to the embodiment of the disclosure may evaluate performance at the application level, by transmitting information on the entire time interval measuring a data volume, not a sum of time intervals in which an actual data volume exists. Accordingly, the device and method for identifying the user equipment throughput for each slice according to the embodiment of the disclosure may identify performance on a situation in which an actual service is provided to a terminal by transmitting information on the entire time interval, even when a high data volume is allocated in a short time interval. In addition, the device and method for identifying the user equipment throughput for each slice according to the embodiment of the disclosure may identify the average of user equipment throughput by transmitting the total number of terminals for a slice related to a specific cell. Accordingly, the device and method for identifying the user equipment throughput for each slice according to the embodiment of the disclosure may identify throughput of each terminal for each slice and provide a throughput assurance service for each terminal.

Figure 12:
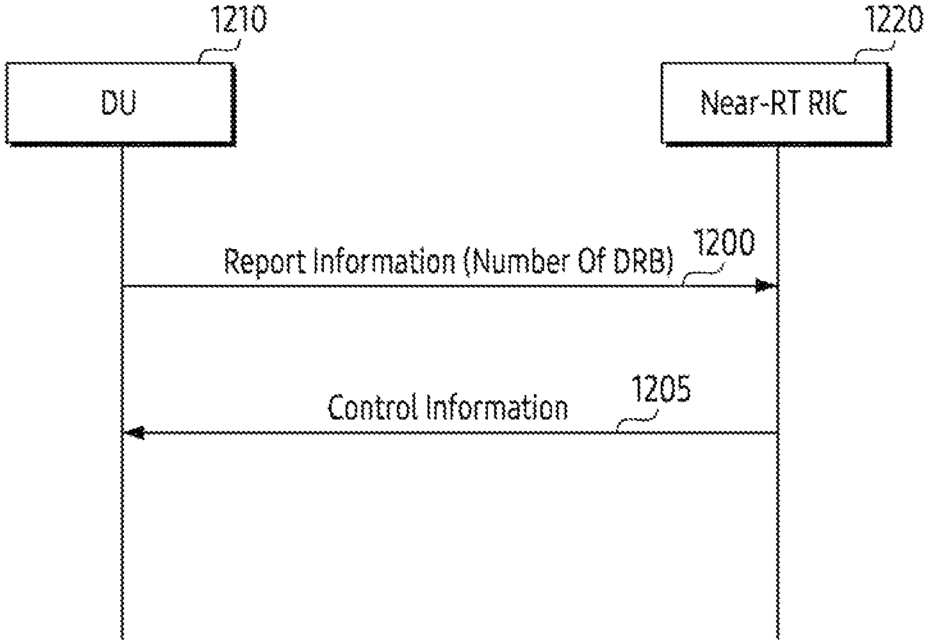
FIG. 12 illustrates an example of resource allocation based on user equipment throughput for a slice.

FIG. 12 illustrates an example of resource allocation based on user equipment throughput for a slice.

In FIG. 12, in operation 1200, the DU 1210 may transmit report information to the RIC 1220. According to an embodiment, the report information may include information on the number of DRBs for cells provided to the DU 1210. For example, the report information may include the following information.

TABLE 2

| Name | Description |
|---|---|
| CellResourceControlList | |
| > CellResourceControlItem | |
| >>Cell Global ID | Cell ID |
| >> slice-report-list | |
| >>> slice-index | Slice Index |
| >>> throughput-report | |
| >>>> transmitted-volume | summed volume during collection duration |
| >>>> collection-duration | Collection duration = Report Period |
| >>>> total-number-of-DRB | Total Number of DRBs used for throughput-volume collection |
| >>>> prb-usage-report | |
| >>>>> assigned-prb-portion | assigned prb portion |
| >>>>> prb-usage | prb usage |

According to an embodiment, the report information may include information for cell resource control (CellResourceControlList). For example, the information for cell resource control may include a cell ID and a slice report list. The slice report list may include an index for a slice related to a cell ID and information for throughput report (throughput-report). The information for throughput report may include volume of transmitted data, collection duration, and the number of DRBs. For example, the volume of the transmitted data may indicate a sum of data volume during the collection duration. The collection duration may indicate the entire time interval (or report period) in which resources for providing a service to a terminal are measured. The entire time interval may include a time when a data volume exists and a time when a data volume does not exist. The number of DRBs may indicate the total number of DRBs related to the data volume for a slice of a specific cell. In other words, the information for throughput report may include the total number of DRBs corresponding to the entire terminal related to the data volume for the slice of the specific cell. The report information may include an allocated PRB portion and a PRB usage. The report information may be referred to as performance data (or performance measurement).

According to an embodiment, the DU 1210 may identify information for the throughput report. For example, the DU 1210 may identify (or collect) information for the throughput report for each slice related to a specific cell. For example, the DU 1210 may identify a sum of volume of data transmitted during a specific report period, for each slice. The specific report period may be referred to as a collection duration. In addition, the DU 1210 may identify the total number of terminals receiving a service through the volume of the transmitted data for each slice.

According to an embodiment, the DU 1210 may transmit the report information to the RIC 1220 through the E2 interface. For example, the report information may be included in an indication message. For example, the indication message may include an RIC indication message. For example, the RIC indication message may include a message container, and the message container may include the report information.

In operation 1205, the RIC 1220 may transmit control information to the DU 1210. For example, the RIC 1220 may transmit control information to the DU 1210 through the E2 interface. According to an embodiment, the control information may include information on a PRB maximum portion for each slice related to a specific cell. For example, the control information may be included in a control message. For example, the control message may include an RIC control message.

According to an embodiment, the RIC 1220 may receive the report information from the DU 1210 and identify user equipment throughput for each slice related to the specific cell based on the received report information. For example, the RIC 1220 may identify the average of user equipment throughput for each slice based on the report information. The average of user equipment throughput may be identified based on a sum of data volume transmitted during collection duration, a length of the collection duration, and the total number of DRBs. For example, when a UE has a one-to-one correspondence with DRB, the total number of DRBs may indicate the total number of terminals for each slice.

According to an embodiment, the RIC 1220 may identify whether the SLA for each slice is satisfied based on identified average of user equipment throughput and a reference throughput. The reference throughput may be set by operator as a predetermined value according to the SLA. The SLA may indicate a metric for indicating a service characteristic.

According to an embodiment, the RIC 1220 may maintain a current resource allocation state for each slice when the average of user equipment throughput satisfies the SLA. On the other hand, when the average of user equipment throughput does not satisfy the SLA, the RIC 1220 may identify a resource allocation size for changing a resource allocation state for each slice, in order to satisfy the SLA. For example, when an average of user equipment throughput for a first slice satisfies a first SLA related to the first slice and an average of user equipment throughput for a second slice does not satisfy a second SLA related to the second slice, the RIC 1220 may change a resource allocation state for the first slice and a resource allocation state for the second slice. For example, the RIC 1220 may change the resource allocation state for the first slice within a range where a changed average of user equipment throughput for the first slice satisfies the first SLA. In addition, the RIC 1220 may change the resource allocation state for the second slice so that a changed average of user equipment allocation size) for changing the resource allocation state may include a PRB maximum portion for each slice related to a specific cell.

In an embodiment, the DU 1210 may identify a resource size allocated to a terminal for each slice through control information received in operation 1205, and allocate a resource to the terminal for each slice based on the identified resource size. In addition, the DU 1210 may provide a service corresponding to the slice through the allocated resource to the terminal.

FIG. 12 illustrates an example of operation 1205 in which the RIC 1220 generates control information and transmits the control information to the DU 1210 based on the report information received through operation 1200, but the embodiments of the disclosure are not limited thereto. For example, the RIC 1220 may identify and only store the report information received from operation 1200, and may not immediately generate the control information based on the received report information. In other words, operation 1205 may not necessarily be continuously performed after operation 1200. Alternatively, the RIC 1220 may transmit control information based on other information rather than the received report information.

FIG. 12 illustrates the DU 1210 as an example of an E2 node that transmits or receives a signal with a near-RT RIC to explain operations for controlling resource allocation. However, the embodiments of the disclosure are not limited thereto. For example, the E2 node may include CU, CU-CP, or CU-UP in addition to the DU 1210.

According to a further embodiment, prior procedures for an E2 interface may be performed first. The DU 1210 may be connected to the near-RT RIC 1220. For example, the DU 1210 may transmit an E2 setup request (SET UP REQUEST) message to the RIC 1220. The E2 NODE FUNCTION located in the DU 1210 may find the RIC using IP address of the RIC 1220 set to operation-administration-maintenance (OAM) and transmit the E2 setup request message. The E2 setup request message may include information (e.g., RAN Function Definition) on a function of the RAN supported by the DU 1210, E2 node ID information, and the like. An RAN Function Definition value is a value set to the OAM. For example, the RAN Function Definition value may include a STYLE ID value. The RIC 1220 may determine which call processing function the DU 1210 supports based on the RAN Function Definition value, by receiving information on the value set to the OAM.

In response to the E2 setup request message, the RIC 1220 may receive an E2 setup response (E2 SETUP RESPONSE) message from the DU 1210. The RIC 1220 may determine whether the E2 setup request message transmitted by the DU 1210 is acceptable. The RIC 1220 may transmit the E2 setup response message to the DU 1210 when the E2 setup request message is acceptable.

The RIC 1220 may transmit a subscription request (RIC SUBSCRIPTION REQUEST) message to the E2 node. A specific xApp located in the RIC 1220 requests subscription (or join) for a specific RAN Function Definition function supported by E2 to an RIC E2 termination function. According to an embodiment, the subscription request message and the E2 setup response message may be separately transmitted. According to another embodiment, the subscription request message may be included in the E2 SETUP RESPONSE message and transmitted together.

The DU 1210 may transmit a subscription request response (RIC SUBSCRIPTION RESPONSE) to the RIC 1220. The E2 node function of the DU 1210 may decode the subscription request message. After the RIC 1220 successfully sets an event condition requested to the E2 node function, the E2 node function of the DU 1210 may deliver to the RIC 1220 that an event trigger condition has been successfully set through a subscription response.

In the above-described, a device and a method for identifying user equipment throughput for each slice according to the embodiment of the disclosure may evaluate performance at an application level, by transmitting information on the entire time interval measuring data volume, not a sum of time intervals in which an actual data volume exists. Accordingly, the device and method for identifying the user equipment throughput for each slice according to the embodiment of the disclosure may identify performance on a situation in which an actual service is provided to a terminal by transmitting information on the entire time interval, even when a high data volume is allocated in a short time interval. In addition, the device and method for identifying the user equipment throughput for each slice according to the embodiment of the disclosure may identify an average of user equipment throughput by transmitting the total number of DRB for a slice related to a specific cell. Accordingly, the device and method for identifying the user equipment throughput for each slice according to the embodiment of the disclosure may identify throughput of each terminal for each slice and provide a throughput assurance service for each terminal.

Figure 13:
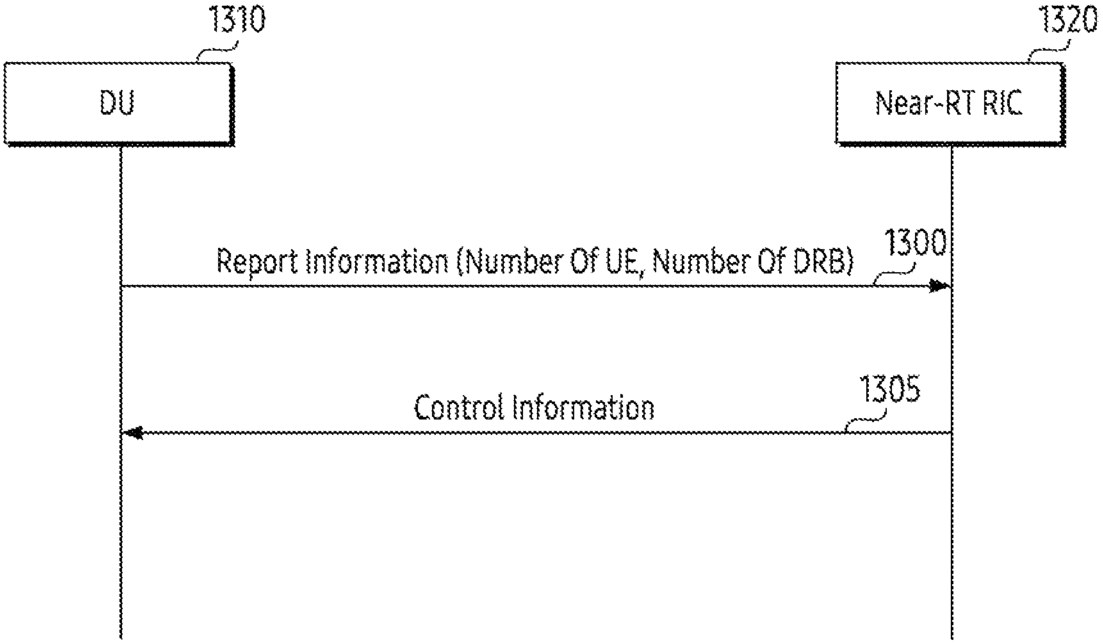
FIG. 13 illustrates an example of resource allocation based on user equipment throughput for a slice.

FIG. 13 illustrates an example of resource allocation based on user equipment throughput for a slice.

In FIG. 13, in operation 1300, the DU 1310 may transmit report information to the RIC 1320. According to an embodiment, the report information may include information on the number of UEs connected to a cell provided to the DU 1310 and the number of DRB for the cell. For example, the report information may include the following information.

TABLE 3

| Name | Description |
|---|---|
| CellResourceControlList | |
| > CellResourceControlItem | |
| >>Cell Global ID | Cell ID |
| >> slice-report-list | |
| >>> slice-index | Slice Index |
| >>> throughput-report | |
| >>>> transmitted-volume | summed volume during collection duration |
| >>>> collection-duration | Collection duration = Report Period |
| >>>> total-number-of-DRB | Total Number of DRBs used for throughput-volume collection |
| >>>> total-number-of-ue | Total Number of UEs used for throughput-volumecollection |
| >>>> prb-usage-report | |
| >>>>> assigned-prb-portion | assigned prb portion |
| >>>>> prb-usage | prb usage |

According to an embodiment, the report information may include information for cell resource control (CellResourceControlList). For example, the information for cell resource control may include a cell ID and a slice report list. The slice report list may include an index for a slice related to a cell ID and information for throughput report (throughput-report). The information for throughput report may include volume of transmitted data, collection duration, the number of terminals, and the number of DRBs. For example, the volume of the transmitted data may indicate a sum of data volume during the collection duration. The collection duration may indicate the entire time interval (or report period) in which resources for providing a service to a terminal are measured. The entire time interval may include a time when a data volume exists and a time when a data volume does not exist. The number of terminals may indicate the total number of terminals related to the data volume for a slice of a specific cell. The number of DRBs may indicate the total number of DRBs related to the data volume for a slice of a specific cell. In other words, the information for throughput report may include the total number of DRBs corresponding to the entire terminal related to the data volume for the slice of the specific cell. The report information may include an allocated PRB portion and a PRB usage. The report information may be referred to as performance data (or performance measurement).

According to an embodiment, the DU 1310 may identify information for the throughput report. For example, the DU 1310 may identify (or collect) information for the throughput report for each slice related to a specific cell. For example, the DU 1310 may identify a sum of volume of data transmitted during a specific report period, for each slice. The specific report period may be referred to as a collection duration. In addition, the DU 1310 may identify the total number of terminals receiving a service through the volume of the transmitted data for each slice.

According to an embodiment, the DU 1310 may transmit the report information to the RIC 1320 through the E2 interface. For example, the report information may be included in an indication message. For example, the indication message may include an RIC indication message. For example, the RIC indication message may include a message container, and the message container may include the report information.

In operation 1305, the RIC 1320 may transmit control information to the DU 1310. For example, the RIC 1320 may transmit control information to the DU 1310 through the E2 interface. According to an embodiment, the control information may include information on a PRB maximum portion for each slice related to a specific cell. For example, the control information may be included in a control message. For example, the control message may include an RIC control message.

According to an embodiment, the RIC 1320 may receive the report information from the DU 1310 and identify user equipment throughput for each slice related to the specific cell based on the received report information. For example, the RIC 1320 may identify the average of user equipment throughput for each slice based on the report information. The average of user equipment throughput may be identified based on a sum of data volume transmitted during collection duration, a length of the collection duration, the total number of terminals, and the total number of DRBs. For example, the RIC 1320 may identify the average of user equipment throughput through the total number of terminals and the total number of DRBs. The RIC 1320 may more accurately identify throughput for each terminal for a slice, by considering the number of DRBs corresponding to each terminal.

According to an embodiment, the RIC 1320 may identify whether the SLA for each slice is satisfied based on identified average of user equipment throughput and a reference throughput. The reference throughput may be set by operator as a predetermined value according to the SLA. The SLA may indicate a metric for indicating a service characteristic.

According to an embodiment, the RIC 1320 may maintain a current resource allocation state for each slice when the average of user equipment throughput satisfies the SLA. On the other hand, when the average of user equipment throughput does not satisfy the SLA, the RIC 1320 may identify a resource allocation size for changing a resource allocation state for each slice, in order to satisfy the SLA. For example, when an average of user equipment throughput for a first slice satisfies a first SLA related to the first slice and an average of user equipment throughput for a second slice does not satisfy a second SLA related to the second slice, the RIC 1320 may change a resource allocation state for the first slice and a resource allocation state for the second slice. For example, the RIC 1320 may change the resource allocation state for the first slice within a range where a changed average of user equipment throughput for the first slice satisfies the first SLA. In addition, the RIC 1320 may change the resource allocation state for the second slice so that a changed average of user equipment allocation size) for changing the resource allocation state may include a PRB maximum portion for each slice related to a specific cell.

In an embodiment, the DU 1310 may identify a resource size allocated to a terminal for each slice through control information received in operation 1305, and allocate a resource to the terminal for each slice based on the identified resource size. In addition, the DU 1310 may provide a service corresponding to the slice through the allocated resource to the terminal.

FIG. 13 illustrates an example of operation 1305 in which the RIC 1320 generates control information and transmits the control information to the DU 1310 based on the report information received through operation 1300, but the embodiments of the disclosure are not limited thereto. For example, the RIC 1320 may identify and only store the report information received from operation 1300, and may not immediately generate the control information based on the received report information. In other words, operation 1305 may not necessarily be continuously performed after operation 1300. Alternatively, the RIC 1320 may transmit control information based on other information rather than the received report information.

FIG. 13 illustrates the DU 1310 as an example of an E2 node that transmits or receives a signal with a near-RT RIC to explain operations for controlling resource allocation. However, the embodiments of the disclosure are not limited thereto. For example, the E2 node may include CU, CU-CP, or CU-UP in addition to the DU 1310.

According to a further embodiment, prior procedures for an E2 interface may be performed first. The DU 1310 may be connected to the RIC 1320. For example, the DU 1310 may transmit an E2 setup request (SET UP REQUEST) message to the RIC 1320. The E2 NODE FUNCTION located in the DU 1310 may find the RIC using IP address of the RIC 1320 set to operation-administration-maintenance (OAM) and transmit the E2 setup request message. The E2 setup request message may include information (e.g., RAN Function Definition) on a function of the RAN supported by the DU 1310, E2 node ID information, and the like. An RAN Function Definition value is a value set to the OAM. For example, the RAN Function Definition value may include a STYLE ID value. The RIC 1320 may determine which call processing function the DU 1310 supports based on the RAN Function Definition value, by receiving information on the value set to the OAM.

In response to the E2 setup request message, the RIC 1320 may receive an E2 setup response (E2 SETUP RESPONSE) message from the DU 1310. The RIC 1320 may determine whether the E2 setup request message transmitted by the DU 1310 is acceptable. The RIC 1320 may transmit the E2 setup response message to the DU 1310 when the E2 setup request message is acceptable.

The RIC 1320 may transmit a subscription request (RIC SUBSCRIPTION REQUEST) message to the E2 node. A specific xApp located in the RIC 1320 requests subscription (or join) for a specific RAN Function Definition function supported by E2 to an RIC E2 termination function. According to an embodiment, the subscription request message and the E2 setup response message may be separately transmitted. According to another embodiment, the subscription request message may be included in the E2 SETUP RESPONSE message and transmitted together.

The DU 1310 may transmit a subscription request response (RIC SUBSCRIPTION RESPONSE) to the RIC 1320. The E2 node function of the DU 1310 may decode the subscription request message. After the RIC 1320 successfully sets an event condition requested to the E2 node function, the E2 node function of the DU 1310 may deliver to the RIC 1320 that an event trigger condition has been successfully set through a subscription response.

In the above-described, a device and a method for identifying user equipment throughput for each slice according to the embodiment of the disclosure may evaluate performance at an application level, by transmitting information on the entire time interval measuring data volume, not a sum of time intervals in which an actual data volume exists. Accordingly, the device and method for identifying the user equipment throughput for each slice according to the embodiment of the disclosure may identify performance on a situation in which an actual service is provided to a terminal by transmitting information on the entire time interval, even when a high data volume is allocated in a short time interval. In addition, the device and method for identifying the user equipment throughput for each slice according to the embodiment of the disclosure may identify an average of user equipment throughput by transmitting the total number of terminals for a slice related to a specific cell. Accordingly, the device and method for identifying the user equipment throughput for each slice according to the embodiment of the disclosure may identify throughput of each terminal for each slice and provide a throughput assurance service for each terminal.

Figure 14:
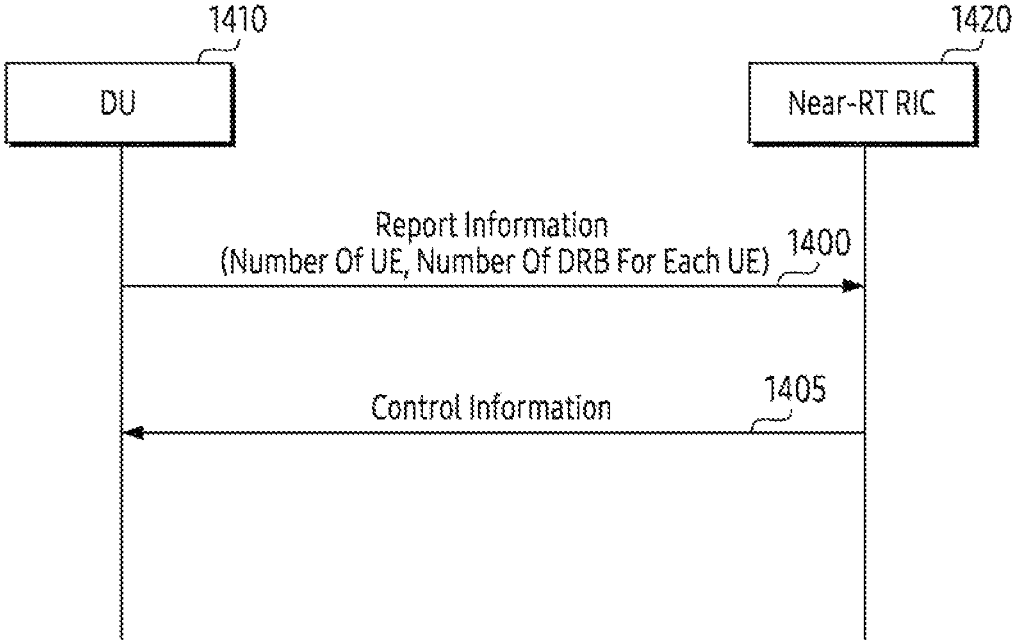
FIG. 14 illustrates an example of resource allocation based on user equipment throughput for a slice.

FIG. 14 illustrates an example of resource allocation based on user equipment throughput for a slice.

In FIG. 14, in operation 1400, the DU 1410 may transmit report information to the RIC 1420. According to an embodiment, the report information may include information on the number of UEs connected to a cell provided to the DU 1410 and the number of DRBs corresponding to each of the UEs. For example, the report information may include the following information.

TABLE 4

| Name | Description |
|---|---|
| CellResourceControlList | |
| > CellResourceControlItem | |
| >>Cell Global ID | Cell ID |
| >> slice-report-list | |
| >>> slice-index | Slice Index |
| >>> throughput-report | |
| >>>> transmitted-volume | summed volume during collection duration |
| >>>> collection-duration | Collection duration = Report Period |
| >>>> total-number-of-ue | Total Number of UEs used for throughput-volumecollection |
| >>>> number-of-DRB per UE | Number of DRBs per UE used for throughput-volume collection |
| >>>> prb-usage-report | |
| >>>>> assigned-prb-portion | assigned prb portion |
| >>>>> prb-usage | prb usage |

According to an embodiment, the report information may include information for cell resource control (CellResourceControlList). For example, the information for cell resource control may include a cell ID and a slice report list. The slice report list may include an index for a slice related to a cell ID and information for throughput report (throughput-report). The information for throughput report may include volume of transmitted data, collection duration, the number of terminals, and the number of DRBs for each terminals. For example, the volume of the transmitted data may indicate a sum of data volume during the collection duration. The collection duration may indicate the entire time interval (or report period) in which resources for providing a service to a terminal are measured. The entire time interval may include a time when a data volume exists and a time when a data volume does not exist. The number of terminals may indicate the total number of terminals related to the data volume for a slice of a specific cell. The number of DRBs for each terminals may indicate the number of DRBs corresponding to the terminal. The report information may include an allocated PRB portion and a PRB usage. The report information may be referred to as performance data (or performance measurement).

According to an embodiment, the DU 1410 may identify information for the throughput report. For example, the DU 1410 may identify (or collect) information for the throughput report for each slice related to a specific cell. For example, the DU 1410 may identify a sum of volume of data transmitted during a specific report period, for each slice. The specific report period may be referred to as a collection duration. In addition, the DU 1410 may identify the total number of terminals receiving a service through the volume of the transmitted data for each slice.

According to an embodiment, the DU 1410 may transmit the report information to the RIC 1420 through the E2 interface. For example, the report information may be included in an indication message. For example, the indication message may include an RIC indication message. For example, the RIC indication message may include a message container, and the message container may include the report information.

In operation 1405, the RIC 1420 may transmit control information to the DU 1410. For example, the RIC 1420 may transmit control information to the DU 1410 through the E2 interface. According to an embodiment, the control information may include information on a PRB maximum portion for each slice related to a specific cell. For example, the control information may be included in a control message. For example, the control message may include an RIC control message.

According to an embodiment, the RIC 1420 may receive the report information from the DU 1410 and identify user equipment throughput for each slice related to the specific cell based on the received report information. For example, the RIC 1420 may identify the average of user equipment throughput for each slice based on the report information. The average of user equipment throughput may be identified based on a sum of data volume transmitted during collection duration, a length of the collection duration, the total number of terminals, and the number of DRBs for each terminals. For example, the RIC 1420 may identify the average of user equipment throughput and DRB average throughput through the total number of terminals and the number of DRBs for each terminals. The RIC 1420 may more accurately identify throughput for each terminal for a slice, by considering the number of DRBs corresponding to each terminal.

According to an embodiment, the RIC 1420 may identify whether the SLA for each slice is satisfied based on identified average of user equipment throughput and a reference throughput. The reference throughput may be set by operator as a predetermined value according to the SLA. The SLA may indicate a metric for indicating a service characteristic.

According to an embodiment, the RIC 1420 may maintain a current resource allocation state for each slice when the average of user equipment throughput satisfies the SLA. On the other hand, when the average of user equipment throughput does not satisfy the SLA, the RIC 1420 may identify a resource allocation size for changing a resource allocation state for each slice, in order to satisfy the SLA. For example, when an average of user equipment throughput for a first slice satisfies a first SLA related to the first slice and an average of user equipment throughput for a second slice does not satisfy a second SLA related to the second slice, the RIC 1420 may change a resource allocation state for the first slice and a resource allocation state for the second slice. For example, the RIC 1420 may change the resource allocation state for the first slice within a range where a changed average of user equipment throughput for the first slice satisfies the first SLA. In addition, the RIC 1420 may change the resource allocation state for the second slice so that a changed average of user equipment throughput for the second slice satisfies the second SLA. Resource information (or resource allocation size) for changing the resource allocation state may include a PRB maximum portion for each slice related to a specific cell.

In an embodiment, the DU 1410 may identify a resource size allocated to a terminal for each slice through control information received in operation 1405, and allocate a resource to the terminal for each slice based on the identified resource size. In addition, the DU 1410 may provide a service corresponding to the slice through the allocated resource to the terminal.

FIG. 14 illustrates an example of operation 1405 in which the RIC 1420 generates control information and transmits the control information to the DU 1410 based on the report information received through operation 1400, but the embodiments of the disclosure are not limited thereto. For example, the RIC 1420 may identify and only store the report information received from operation 1400, and may not immediately generate the control information based on the received report information. In other words, operation 1405 may not necessarily be continuously performed after operation 1400. Alternatively, the RIC 1420 may transmit control information based on other information rather than the received report information.

FIG. 14 illustrates the DU 1410 as an example of an E2 node that transmits or receives a signal with a near-RT RIC to explain operations for controlling resource allocation. However, the embodiments of the disclosure are not limited thereto. For example, the E2 node may include CU, CU-CP, or CU-UP in addition to the DU 1410.

According to a further embodiment, prior procedures for an E2 interface may be performed first. The DU 1410 may be connected to the RIC 1420. For example, the DU 1410 may transmit an E2 setup request (SET UP REQUEST) message to the RIC 1420. The E2 NODE FUNCTION located in the DU 1410 may find the RIC using IP address of the RIC 1420 set to operation-administration-maintenance (OAM) and transmit the E2 setup request message. The E2 setup request message may include information (e.g., RAN Function Definition) on a function of the RAN supported by the DU 1410, E2 node ID information, and the like. An RAN Function Definition value is a value set to the OAM. For example, the RAN Function Definition value may include a STYLE ID value. The RIC 1420 may determine which call processing function the DU 1410 supports based on the RAN Function Definition value, by receiving information on the value set to the OAM.

In response to the E2 setup request message, the RIC 1420 may receive an E2 setup response (E2 SETUP RESPONSE) message from the DU 1410. The RIC 1420 may determine whether the E2 setup request message transmitted by the DU 1410 is acceptable. The RIC 1420 may transmit the E2 setup response message to the DU 1410 when the E2 setup request message is acceptable.

The RIC 1420 may transmit a subscription request (RIC SUBSCRIPTION REQUEST) message to the E2 node. A specific xApp located in the RIC 1420 requests subscription (or join) for a specific RAN Function Definition function supported by E2 to an RIC E2 termination function. According to an embodiment, the subscription request message and the E2 setup response message may be separately transmitted. According to another embodiment, the subscription request message may be included in the E2 SETUP RESPONSE message and transmitted together.

The DU 1410 may transmit a subscription request response (RIC SUBSCRIPTION RESPONSE) to the RIC 1420. The E2 node function of the DU 1410 may decode the subscription request message. After the RIC 1420 successfully sets an event condition requested to the E2 node function, the E2 node function of the DU 1410 may deliver to the RIC 1420 that an event trigger condition has been successfully set through a subscription response.

In the above-described, a device and a method for identifying user equipment throughput for each slice according to the embodiment of the disclosure may evaluate performance at an application level, by transmitting information on the entire time interval measuring data volume, not a sum of time intervals in which an actual data volume exists.

Accordingly, the device and method for identifying the user equipment throughput for each slice according to the embodiment of the disclosure may identify performance on a situation in which an actual service is provided to a terminal by transmitting information on the entire time interval, even when a high data volume is allocated in a short time interval. In addition, the device and method for identifying the user equipment throughput for each slice according to the embodiment of the disclosure may identify an average of user equipment throughput by transmitting the total number of terminals for a slice related to a specific cell. Accordingly, the device and method for identifying the user equipment throughput for each slice according to the embodiment of the disclosure may identify throughput of each terminal for each slice and provide a throughput assurance service for each terminal.

Figure 15A:
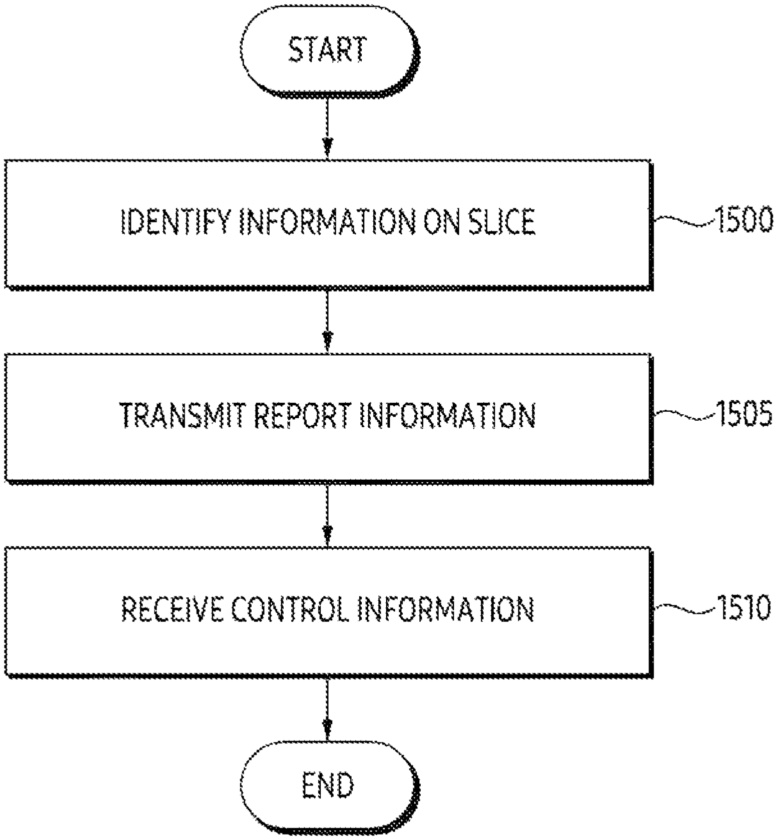
FIG. 15A illustrates an example of an operation flow of a digital unit (DU) that performs resource allocation based on user equipment throughput for a slice.

FIG. 15A illustrates an example of an operation flow of a digital unit (DU) that performs resource allocation based on user equipment throughput for a slice.

Operation of FIG. 15A illustrates operation of the DU as an example of an E2 node, but the embodiment of the disclosure is not limited thereto. For example, the E2 node may include DU, CU, CU-CP, and CU-UP.

In FIG. 15A, in operation 1500, the DU may identify information on a slice. For example, the DU may identify information on the slice related to a specific cell. The information on the slice may be referred to as information for throughput report. According to an embodiment, the DU may identify (or collect) the information for the throughput report for each slice related to a specific cell. For example, the DU may identify a sum of volume of data transmitted during a specific report period, for each slice. The specific report period may be referred to as a collection duration. In addition, the DU 1110 may identify the total number of terminals that receive a service through the volume of the transmitted data for each slice. FIG. 15A illustrates an example of identifying information on each of at least one slice related to one cell, but the embodiments of the disclosure are not limited thereto. For example, the DU may identify information on each of at least one slice related to each cell, for a plurality of cells related to the DU.

In operation 1505, the DU may transmit report information to the RIC. For example, the DU may transmit the report information including information on the slice to the RIC through the E2 interface. The RIC may include a near-RT RIC. The report information may be included in a message container. The message container may be included in the RIC indication message and transmitted from the DU to the RIC. FIG. 15A shows an example of transmitting information on each of at least one slice related to one cell, but the embodiments of the disclosure are not limited thereto. For example, for a plurality of cells related to the DU, the DU may transmit the report information identified for each of at least one slice related to each cell to the RIC for each slice.

According to an embodiment, the report information may include information for cell resource control (CellResourceControlList). For example, the information for cell resource control may include a cell ID and a slice report list. The slice report list may include an index for a slice related to a cell ID and information for throughput report (throughput-report). The information for throughput report may include volume of transmitted data, collection duration, the number of terminals, and the number of DRBs. For example, the volume of the transmitted data may indicate a sum of data volume during the collection duration. The collection duration may indicate the entire time interval (or report period) in which resources for providing a service to a terminal are measured. The entire time interval may include a time when a data volume exists and a time when a data volume does not exist. The number of terminals may indicate the total number of terminals related to the data volume for a slice of a specific cell. The number of DRBs may indicate the total number of DRBs related to the data volume for a slice of a specific cell. In other words, the information for throughput report may include the total number of DRBs corresponding to the entire terminal related to the data volume for the slice of the specific cell. The report information may include an allocated PRB portion and a PRB usage. The report information may be referred to as performance data (or performance measurement).

According to an embodiment, the report information may include information for cell resource control (CellResourceControlList). For example, the information for cell resource control may include a cell ID and a slice report list. The slice report list may include an index for a slice related to a cell ID and information for throughput report (throughput-report). The information for throughput report may include volume of transmitted data, collection duration, and the number of DRBs. For example, the volume of the transmitted data may indicate a sum of data volume during the collection duration. The collection duration may indicate the entire time interval (or report period) in which resources for providing a service to a terminal are measured. The entire time interval may include a time when a data volume exists and a time when a data volume does not exist. The number of DRBs may indicate the total number of DRBs related to the data volume for a slice of a specific cell. In other words, the information for throughput report may include the total number of DRBs corresponding to the entire terminal related to the data volume for the slice of the specific cell. The report information may include an allocated PRB portion and a PRB usage. The report information may be referred to as performance data (or performance measurement).

According to an embodiment, the report information may include information for cell resource control (CellResourceControlList). For example, the information for cell resource control may include a cell ID and a slice report list. The slice report list may include an index for a slice related to a cell ID and information for throughput report (throughput-report). The information for throughput report may include volume of transmitted data, collection duration, the number of terminals, and the number of DRBs. For example, the volume of the transmitted data may indicate a sum of data volume during the collection duration. The collection duration may indicate the entire time interval (or report period) in which resources for providing a service to a terminal are measured. The entire time interval may include a time when a data volume exists and a time when a data volume does not exist. The number of terminals may indicate the total number of terminals related to the data volume for a slice of a specific cell. The number of DRBs may indicate the total number of DRBs related to the data volume for a slice of a specific cell. In other words, the information for throughput report may include the total number of DRBs corresponding to the entire terminal related to the data volume for the slice of the specific cell. The report information may include an allocated PRB portion and a PRB usage. The report information may be referred to as performance data (or performance measurement).

According to an embodiment, the report information may include information for cell resource control (CellResourceControlList). For example, the information for cell resource control may include a cell ID and a slice report list. The slice report list may include an index for a slice related to a cell ID and information for throughput report (throughput-report). The information for throughput report may include volume of transmitted data, collection duration, the number of terminals, and the number of DRBs for each terminals. For example, the volume of the transmitted data may indicate a sum of data volume during the collection duration. The collection duration may indicate the entire time interval (or report period) in which resources for providing a service to a terminal are measured. The entire time interval may include a time when a data volume exists and a time when a data volume does not exist. The number of terminals may indicate the total number of terminals related to the data volume for a slice of a specific cell. The number of DRBs for each terminals may indicate the number of DRBs corresponding to the terminal. The report information may include an allocated PRB portion and a PRB usage. The report information may be referred to as performance data (or performance measurement).

In operation 1510, the DU may receive control information from the RIC. The control information may include information on a size of a resource allocated to the slice. For example, the DU may receive the information on a size of a resource allocated to the slice, identified based on information on the slice, from the RIC through the E2 interface. The control information may include information on a PRB maximum portion for each slice related to a specific cell. For example, the control information may be included in a control message. For example, the control message may include an RIC control message.

In an embodiment, the DU may identify a resource size allocated to a terminal for each slice through the information on a size of a resource allocated to the slice, received in operation 1510, and allocate a resource to the terminal for each slice based on the identified resource size. In addition, the DU may provide a service corresponding to the slice to the terminal through the allocated resource.

Figure 15B:
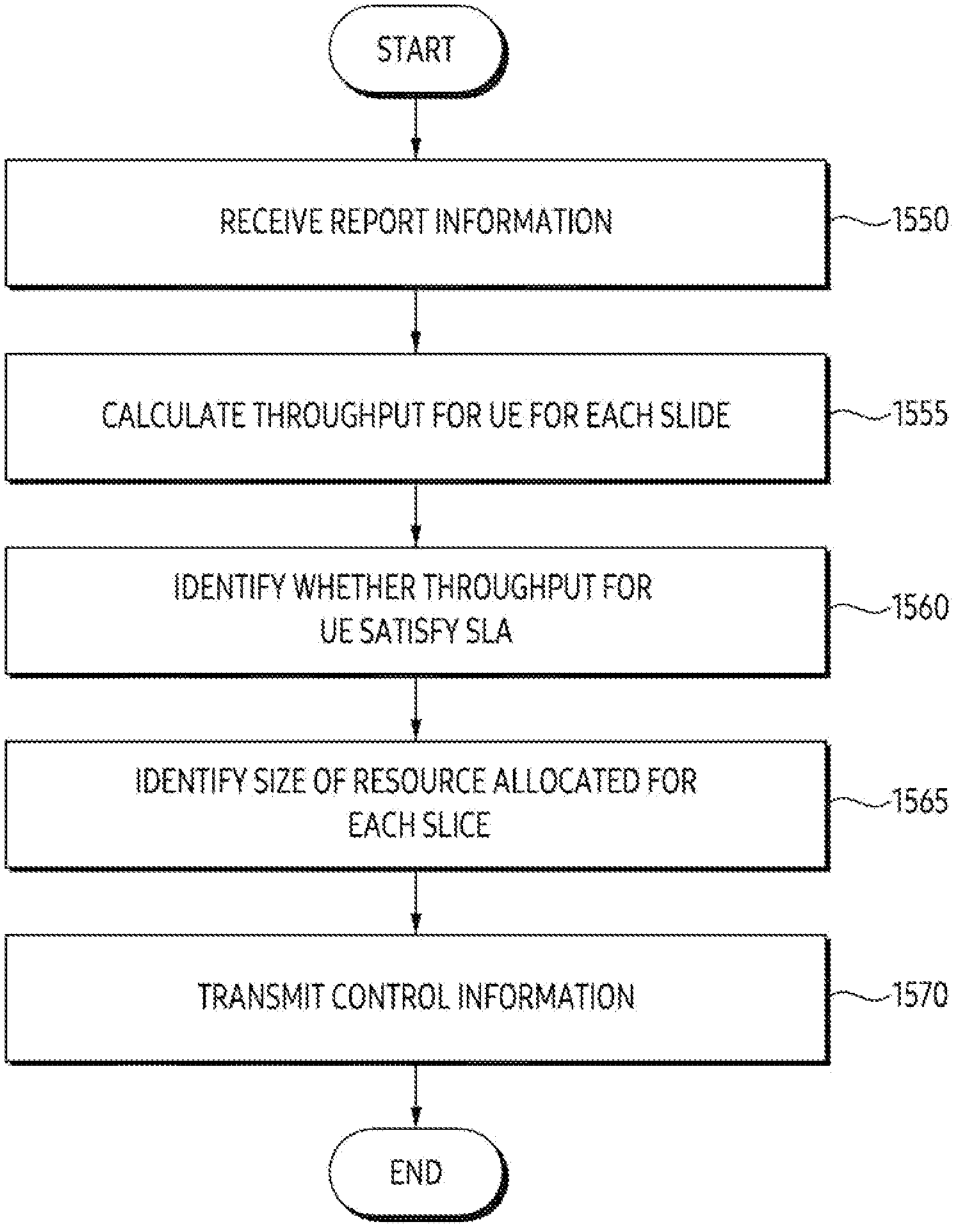
FIG. 15B illustrates an example of an operation flow of a near-RT RIC that transmits resource allocation information based on user equipment throughput for a slice.

FIG. 15B illustrates an example of an operation flow of a near-RT RIC that transmits resource allocation information based on terminal throughput for a slice.

Operation of FIG. 15B illustrates a near-RT RIC operation connected to a DU as an example of an E2 node, but the embodiment of the disclosure is not limited thereto. For example, the E2 node may include DU, CU, CU-CP, and CU-UP.

In operation 1550, the RIC may receive report information from the DU. The report information may include information on a slice. The information on a slice may be received through the E2 interface. The report information may be transmitted from the DU to the RIC through a message container included in an RIC indication message.

According to an embodiment, the report information may include information for cell resource control (CellResourceControlList). For example, the information for cell resource control may include a cell ID and a slice report list. The slice report list may include an index for a slice related to a cell ID and information for throughput report (throughput-report). The information for throughput report may include volume of transmitted data, collection duration, the number of terminals, and the number of DRBs.

According to an embodiment, the report information may include information for cell resource control (CellResourceControlList). For example, the information for cell resource control may include a cell ID and a slice report list. The slice report list may include an index for a slice related to a cell ID and information for throughput report (throughput-report). The information for throughput report may include volume of transmitted data, collection duration, and the number of DRBs.

According to an embodiment, the report information may include information for cell resource control (CellResourceControlList). For example, the information for cell resource control may include a cell ID and a slice report list. The slice report list may include an index for a slice related to a cell ID and information for throughput report (throughput-report). The information for throughput report may include volume of transmitted data, collection duration, the number of terminals, and the number of DRBs.

According to an embodiment, the report information may include information for cell resource control (CellResourceControlList). For example, the information for cell resource control may include a cell ID and a slice report list. The slice report list may include an index for a slice related to a cell ID and information for throughput report (throughput-report). The information for throughput report may include volume of transmitted data, collection duration, the number of terminals, and the number of DRBs for each terminals.

In operation 1555, the RIC may identify terminal throughput for each slice related to a specific cell, based on the information on a received slice. For example, the RIC may identify the average of user equipment throughput for each slice, based on the information on a slice. For example, the average of user equipment throughput may be identified based on a sum of data volume transmitted during collection duration, a length of the collection duration, and the total number of terminals. For example, the average of user equipment throughput may be identified based on a sum of data volume transmitted during collection duration, a length of the collection duration, and the total number of DRBs. For example, the average of user equipment throughput may be identified based on a sum of data volume transmitted during collection duration, a length of the collection duration, the total number of terminals, and the total number of DRBs. For example, the average of user equipment throughput may be identified based on a sum of data volume transmitted during collection duration, a length of the collection duration, the total number of terminals, and the number of DRBs for each terminal.

In operation 1560, the RIC may identify whether the SLA for each slice is satisfied based on the identified average of user equipment throughput and a reference throughput. The reference throughput may be set by operator as a predetermined value according to the SLA. The SLA may indicate a metric for indicating a service characteristic.

According to an embodiment, in operation 1565, the RIC may identify the size of resources allocated for each slice. For example, the RIC may maintain a current resource allocation state for each slice when the average of user equipment throughput satisfies the SLA. On the other hand, when the average of user equipment throughput does not satisfy the SLA, the RIC may identify a resource allocation size for changing a resource allocation state for each slice, in order to satisfy the SLA. For example, when an average of user equipment throughput for a first slice satisfies a first SLA related to the first slice and an average of user equipment throughput for a second slice does not satisfy a second SLA related to the second slice, the RIC may change a resource allocation state for the first slice and a resource allocation state for the second slice. For example, the RIC may change the resource allocation state for the first slice within a range where a changed average of user equipment throughput for the first slice satisfies the first SLA. In addition, the RIC may change the resource allocation state for the second slice so that a changed average of user equipment throughput for the second slice satisfies the second SLA. Resource information (or resource allocation size) for changing the resource allocation state may include a PRB maximum portion for each slice related to a specific cell.

In operation 1570, the RIC may receive control information. For example, the control information may be included in a control message. For example, the control message may include an RIC control message. For example, the RIC may transmit the control information to the DU through the E2 interface. The control information may include resource information for changing the resource allocation state. For example, resource information for changing the resource allocation state may include a resource allocation size for changing a resource allocation state for each slice. According to an embodiment, resource information (or resource allocation size) for changing the resource allocation state may include a PRB maximum portion for each slice related to a specific cell.

FIG. 15B illustrates an example of operation 1570 in which the RIC generates control information and transmits the control information to the DU based on the report information received through operation 1550, but the embodiments of the disclosure are not limited thereto. For example, the RIC may identify and only store the report information received from operation 1550, and may not immediately generate the control information based on the received report information. In other words, operation 1570 may not necessarily be continuously performed after operation 1550. Alternatively, the RIC may transmit control information based on other information rather than the received report information.

In FIGS. 1 to 15B, according to the embodiments of the disclosure, the near-RT RIC may receive information necessary for a terminal throughput calculation from the DU, in order to provide a service with assured terminal throughput. For example, the DU may report the information to the near-RT RIC through the E2 interface. The information may be used to identify throughput at the application level. In other words, the near-RT RIC may identify performance of a service actually provided at an application level. Unlike a case of reporting throughput information measured for each terminal or each bearer, a device and a method for identifying terminal throughput for each slice according to embodiments of the disclosure may transmit report information for identifying throughput of a terminal for each specific cell and a slice related to the specific cell. In addition, a device and a method for identifying terminal throughput for each slice according to embodiments of the disclosure may include the report information including information on the number of terminals (or the number of DRBs) that are provided with a service for each slice. A device and a method for identifying terminal throughput for each slice according to embodiments of the disclosure may identify throughput at a terminal level through the report information including the number of terminals or the number of DRBs. In other words, by identifying average user equipment throughput, the near-RT RIC may identify throughput of each terminal for each slice and more accurately identify the degree of service provision (or performance at application level) for each terminal. According to embodiments of the disclosure, an assurance service based on throughput felt by a user may be provided by identifying throughput of each terminal for each slice and evaluating the degree of service provision.

The effects that can be obtained from the disclosure are not limited to those described above, and any other effects not mentioned herein will be clearly understood by those having ordinary knowledge in the art to which the disclosure belongs, from the following description.

As mentioned above, a method performed by a near-RT RIC, the method may comprise receiving, from an E2 node, an indication message including information on a slice associated with a cell. The method may comprise identifying a size of a resource allocated for the slice based on the information on the slice. The method may comprise transmitting, to the E2 node, a control message including information on the size of the resource. The information on the slice may comprise collection duration, a sum of data volume during the collection duration, and information on a terminal associated with the slice.

According to an embodiment, the indication message may include a cell identity associated with the cell and index information associated with the slice. The information on the slice may correspond to the index information.

According to an embodiment, the information on the terminal associated with the slice may comprise at least one of a number of terminals provided with a service through the data volume for the slice, or a number of DRBs for providing the service through the data volume for the slice.

According to an embodiment, the indication message may comprise a PRB (physical resource block) allocating portion and information on a PRB usage.

According to an embodiment, the control message may comprise information on a PRB maximum portion for the slice associated with the cell.

As mentioned above, a near-RT RIC may comprise memory including instructions. The Near-RT RIC may comprise a transceiver. The near-RT RIC may comprise a processor. The instructions, when executed by the processor, may cause the Near-RT RIC to receive, from an E2 node through the transceiver, an indication message including information on a slice associated with a cell. The instructions, when executed by the processor, may cause the Near-RT RIC to identify a size of the resource allocated for the slice based on the information on the slice. The instructions, when executed by the processor, may cause the Near-RT RIC to transmit, to the E2 node through the transceiver, a control message including information on the size of the resource. The information on the slice may comprise collection duration, a sum of data volume during the collection duration, and information on a terminal associated with the slice.

According to an embodiment, the indication message may comprise a cell identity associated with the cell and index information associated with the slice. The information on the slice may correspond to the index information.

According to an embodiment, the information on the terminal associated with the slice may comprise at least one of a number of terminals provided with a service through the data volume for the slice, or a number of DRBs for providing a service through the data volume for the slice.

According to an embodiment, the indication message may comprise a PRB (physical resource block) allocating portion and information on a PRB usage.

According to an embodiment, the control message may comprise information on a PRB maximum portion for the slice associated with the cell.

As mentioned above, a method performed by an E2 node, the method may comprise identifying information on a slice associated with a cell. The method may comprise transmitting, to a near-RT RIC, an indication message including information on the identified slice. The method may comprise receiving, from the near-RT RIC, a control message including information on a size of a resource allocated for the slice. The information on the slice may comprise collection duration, a sum of data volume during the collection duration, and information on a terminal associated with the slice.

According to an embodiment, the indication message may comprise a cell identity associated with the cell and index information associated with the slice. The information on the slice may correspond to the index information.

According to an embodiment, the information on the terminal associated with the slice may comprise at least one of a number of terminals provided with a service through the data volume for the slice, or a number of DRBs for providing a service through the data volume for the slice.

According to an embodiment, the indication message may comprise a PRB (physical resource block) allocating portion and information on a PRB usage.

According to an embodiment, the control message may comprise information on a PRB maximum portion for the slice associated with the cell.

As mentioned above, an E2 node may comprise memory including instructions. The E2 node may comprise a transceiver. The E2 node may comprise a processor. The instructions, when executed by the processor, cause the E2 node to identify information on a slice associated with a cell. The instructions, when executed by the processor, cause the E2 node to transmit, to a near-RT RIC through the transceiver, an indication message including information on the identified slice. The instructions, when executed by the processor, cause the E2 node to receive, from the near-RT RIC through the transceiver, a control message including information on a size of a resource allocated for the slice. The information on the slice may comprise collection duration, a sum of data volume during the collection duration, and information on a terminal associated with the slice.

According to an embodiment, the indication message may comprise a cell identity associated with the cell and index information associated with the slice. The information on the slice may correspond to the index information.

According to an embodiment, the information on the terminal associated with the slice may comprise at least one of a number of terminals provided with a service through the data volume for the slice, or a number of DRBs for providing the service through the data volume for the slice.

According to an embodiment, the indication message may comprise a PRB (physical resource block) allocating portion and information on a PRB usage.

According to an embodiment, the control message may comprise information on a PRB maximum portion for the slice associated with the cell.

Methods according to the embodiments described in the claims or the specification of the disclosure may be implemented in the form of hardware, software, or a combination of hardware and software.

When implemented as software, a computer-readable storage medium storing one or more program (software module) may be provided. The one or more program stored in the computer-readable storage medium is configured for execution by one or more processor in the electronic device. The one or more programs include instructions that cause the electronic device to execute methods according to embodiments described in the claim or the specification of the disclosure.

Such program (software modules, software) may be stored in random access memory, non-volatile memory including flash memory, read only memory (ROM), electrically erasable programmable read only memory (EEPROM), magnetic disc storage device, compact disc-ROM (CD-ROM), digital versatile disc (DVD) or other form of optical storage, magnetic cassette. Alternatively, it may be stored in a memory configured with some or all combinations thereof. In addition, each configuration memory may be included a plurality.

In addition, the program may be stored in an attachable storage device that may be accessed through a communication network, such as the Internet, Intranet, local area network (LAN), wide area network (WAN), or storage area network (SAN), or a combination thereof. Such a storage device may be connected to a device performing an embodiment of the disclosure through an external port. In addition, a separate storage device on the communication network may access a device performing an embodiment of the disclosure.

In the above-described specific embodiments of the disclosure, the component included in the disclosure is expressed in singular or plural according to the presented specific embodiment. However, singular or plural expression is chosen appropriately for the situation presented for convenience of explanation, and the disclosure is not limited to singular or plural component, and even if the component is expressed in plural, it may be configured with singular, or even if it is expressed in singular, it may be configured with plural.

In the detailed description of the disclosure, specific embodiments have been described, but it goes without saying that various modifications are possible without departing from the scope of the disclosure.

What is claimed is:

1. A method performed by a near-real time (RT) radio access network intelligent controller (RIC), the method comprising:
- receiving, from an E2 node, an RIC indication message indicating a data volume transmitted in a network slice, a total number of terminals in the network slice, and a collection duration of the data volume;
- identifying an average throughput for the terminals during the collection duration in the network slice based on the RIC indication message;
- identifying a maximum physical resource block (PRB) allocation ratio for the network slice based on the average throughput and a reference throughput; and
- transmitting, to the E2 node, an RIC control message indicating the maximum PRB allocation ratio.

2. The method of claim 1, wherein the RIC indication message further indicates a cell identity associated with the network slice and an index of the network slice.

3. The method of claim 1, wherein the

RIC indication message further indicates a total number of data radio bearers (DRBs) in the network slice, and wherein the collection duration includes a time interval including a time when the data volume exists and a time when the data volume does not exist.

4. The method of claim 1, wherein the RIC indication message further includes a physical resource block (PRB) allocating portion and information on a PRB usage.

5. A near real-time (RT) radio access network (RAN) intelligent controller (RIC) comprising:
- memory including instructions;
- a transceiver; and
- a processor,
- wherein the instructions, when executed by the processor, cause the near-RT RIC to:

receive, from an E2 node through the transceiver, an RIC indication message indicating a data volume transmitted in a network slice, a total number of terminals in the network slice, and a collection duration of the data volume;

identify an average throughput for the terminals during the collection duration in the network slice based on the RIC indication message;

identify a maximum physical resource block (PRB) allocation ratio for the network slice based on the average throughput and a reference throughput; and transmit, to the E2 node through the transceiver, an RIC control message indicating the maximum PRB allocation ratio.

6. The near-RT RIC of claim 5, wherein the RIC indication message further indicates a cell identity associated with the network slice and an index of the network slice.

7. The near-RT RIC of claim 5, wherein the

RIC indication message further indicates a total number of data radio bearers (DRBs) in the network slice, and wherein the collection duration includes a time interval including a time when the data volume exists and a time when the data volume does not exist.

8. The near-RT RIC of claim 5, wherein the RIC indication message further includes a physical resource block (PRB) allocating portion and information on a PRB usage.

9. A method performed by an E2 node, the method comprising:

identifying a data volume transmitted in a network slice, a total number of terminals in the network slice, and a collection duration of the data volume;

transmitting, to a near-real time (RT) radio access network intelligent controller (RIC), an RIC indication message indicating the data volume, the total number of terminals, and the collection duration, wherein the RIC indication message is used to identify an average throughput for the terminals during the collection duration in the network slice, and wherein the average throughput is used to identify a maximum physical resource block (PRB) allocation ratio for the network slice; and receiving, from the near-RT RIC, an RIC control message indicating the maximum PRB allocation ratio for the network slice.

10. The method of claim 9, wherein the RIC indication message further indicates a cell identity associated with the network slice and an index of the network slice.

11. The method of claim 9, wherein the

RIC indication message further indicates a total number of data radio bearers (DRBs) in the network slice, and wherein the collection duration includes a time interval including a time when the data volume exists and a time when the data volume does not exist.

12. The method of claim 9, wherein the RIC indication message further includes a physical resource block (PRB) allocating portion and information on a PRB usage.

13. An E2 node comprising:

memory including instructions;

a transceiver; and a processor, wherein the instructions, when executed by the processor, cause the E2 node to:

identify a data volume transmitted in a network slice, a total number of terminals in the network slice, and a collection duration of the data volume;

transmit, to a near-real time (RT) radio access network (RAN) intelligent controller (RIC) through the transceiver, an RIC indication message indicating the data volume, the total number of terminals, and the collection duration, wherein the RIC indication message is used to identify an average throughput for the terminals during the collection duration in the network slice, and wherein the average throughput is used to identify a maximum physical resource block (PRB) allocation ratio for the network slice; and receive, from the near-RT RIC through the transceiver, an RIC control message indicating the maximum PRB allocation ratio for the network slice.

14. The E2 node of claim 13, wherein the RIC indication message further indicates a cell identity associated with the network slice and an index of the network slice.

15. The E2 node of claim 13, wherein the

RIC indication message further indicates a total number of data radio bearers (DRBs) in the network slice.

16. The E2 node of claim 13, wherein the RIC indication message further includes a physical resource block (PRB) allocating portion and information on a PRB usage.

* * * * *